United States Patent
Singh et al.

(10) Patent No.: US 9,080,089 B2
(45) Date of Patent: Jul. 14, 2015

(54) NANOPARTICLES FOR HEAT TRANSFER AND THERMAL ENERGY STORAGE

(71) Applicants: Dileep Singh, Naperville, IL (US); Sreeram Cingarapu, Darian, IL (US); Elena V. Timofeeva, Chicago, IL (US); Michael Moravek, Lemont, IL (US)

(72) Inventors: Dileep Singh, Naperville, IL (US); Sreeram Cingarapu, Darian, IL (US); Elena V. Timofeeva, Chicago, IL (US); Michael Moravek, Lemont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 357 days.

(21) Appl. No.: 13/627,749

(22) Filed: Sep. 26, 2012

(65) Prior Publication Data
US 2014/0084205 A1    Mar. 27, 2014

(51) Int. Cl.
| C09K 5/00 | (2006.01) |
| C09K 5/06 | (2006.01) |
| C09K 5/10 | (2006.01) |
| C09K 5/12 | (2006.01) |
| B82Y 30/00 | (2011.01) |
| B82Y 40/00 | (2011.01) |

(52) U.S. Cl.
CPC . *C09K 5/063* (2013.01); *C09K 5/10* (2013.01); *C09K 5/12* (2013.01); *B82Y 30/00* (2013.01); *B82Y 40/00* (2013.01)

(58) Field of Classification Search
CPC .............. C09K 3/18; C09K 5/00; C09K 5/02; C09K 5/06; C09K 5/063; C09K 5/08; C09K 5/10; C09K 5/12
USPC .......................................................... 252/74
See application file for complete search history.

(56) References Cited

U.S. PATENT DOCUMENTS

| 1,984,369 | A | * | 12/1934 | Gensch ........................... 252/71 |
| 4,067,315 | A | * | 1/1978 | Fehlner et al. ................ 126/636 |
| 4,534,794 | A | * | 8/1985 | Walter et al. ............... 106/14.05 |
| 4,696,338 | A | * | 9/1987 | Jensen et al. ............. 165/104.17 |
| 6,402,982 | B1 | * | 6/2002 | Salyer ............................. 252/70 |
| 7,306,823 | B2 | * | 12/2007 | Sager et al. .................... 427/217 |
| 7,820,066 | B2 | | 10/2010 | Jeffcoate et al. |
| 7,871,533 | B1 | | 1/2011 | Haiping et al. |
| 7,900,450 | B2 | | 3/2011 | Gurin |
| 7,926,554 | B2 | | 4/2011 | Tung et al. |
| 2005/0012069 | A1 | | 1/2005 | Maes et al. |
| 2009/0123507 | A1 | * | 5/2009 | Ohrlein et al. ................ 424/421 |
| 2009/0180976 | A1 | * | 7/2009 | Seeney et al. .................. 424/59 |

(Continued)

OTHER PUBLICATIONS

Shin et al. "Enhancement of specific heat capacity of high-temperature silica-nanofluid synthesized in alkali chloride salt eutectics for solar thermal-energy storage applications", International Journal of Heat and Mass Transfer, 54, 2011, 1064-1070. published online Dec. 13, 2010.*

(Continued)

*Primary Examiner* — Jane L Stanley
(74) *Attorney, Agent, or Firm* — Foley & Lardner LLP

(57) ABSTRACT

An article of manufacture and method of preparation thereof. The article of manufacture and method of making the article includes an eutectic salt solution suspensions and a plurality of nanocrystalline phase change material particles having a coating disposed thereon and the particles capable of undergoing the phase change which provides increase in thermal energy storage. In addition, other articles of manufacture can include a nanofluid additive comprised of nanometer-sized particles consisting of copper decorated graphene particles that provide advanced thermal conductivity to heat transfer fluids.

14 Claims, 33 Drawing Sheets

(56) References Cited

U.S. PATENT DOCUMENTS

| | | | |
|---|---|---|---|
| 2009/0236079 A1 | 9/2009 | Khodadadi | |
| 2010/0116457 A1* | 5/2010 | Ottinger et al. | 165/10 |
| 2010/0288472 A1 | 11/2010 | McCants et al. | |
| 2011/0146959 A1* | 6/2011 | Root | 165/108 |
| 2012/0006509 A1 | 1/2012 | McCants et al. | |
| 2012/0187332 A1* | 7/2012 | Iruvanti et al. | 252/73 |

OTHER PUBLICATIONS

Tamme et al. "Latent heat storage above 120C for applications in the industrial process heat secotr and solar power generation", International Journal of Energy Research, 2008, 32:264-274. published online Jul. 11, 2007.*

Abbott et al. "Electrodeposition of zinc-tin alloys from deep eutectic solvents based on choline chloride", J. Electroanalytical Chemistry, 599, 2007, 288-294. published online Jun. 21, 2006.*

Willert et al. "Synthesis of Inorganic and Metallic Nanoparticles by Miniemulsification of Molten Salts and Metals", Chem. Mater., 2001, 13, 4681-4685. published online Oct. 9, 2001.*

* cited by examiner

NANOPARTICLES FOR HEAT TRANSFER AND THERMAL ENERGY STORAGE

GOVERNMENT INTEREST

The United States Government has certain rights in this invention pursuant to Contract No. DE-AC02-06CH11357 between the United States Department of Energy and University of Chicago Argonne, LLC as operator of Argonne National Laboratories.

FIELD OF THE INVENTION

The present invention relates generally to the field of heat transfer and thermal energy storage. More particularly, the invention relates to use of nanoparticles for improved heat transfer and thermal energy storage. Further, the invention relates to particular nanoparticle articles of manufacture, including, for example, encapsulated phase change zinc nanoparticles, silica encapsulated tin nanoparticles and copper decorated graphene nanoparticles.

BACKGROUND OF THE INVENTION

The demand for highly efficient energy storage and heat transfer encompasses a broad range of technologies involving any form of energy creation, storage and usage. In an age of increasing heat fluxes and power loads in applications as diverse as medical equipment, power electronics, renewable energy, and transportation, liquid cooling systems are necessary to enhance heat dissipation, improve energy efficiency, and lengthen devices lifetime. To satisfy these increasing thermal management needs, the heat transfer efficiency of conventional fluids must be improved. For example, there is a significant effort to develop and deploy viable renewable energy technologies. In this regard, for example, solar energy is one of the promising options. However, current costs to produce electricity using solar technologies, such as Concentrated Solar Power ("CSP"), are not cost competitive as compared to the traditional energy generation technologies based on fossil fuels and nuclear. Several strategies have been proposed to increase the overall efficiencies and reduce costs for solar energy production. It is envisioned that development of high efficiency and high heat capacity thermal storage fluids will reduce the overall thermal storage costs, increase system efficiency, reduce structural storage volume, and contribute to bringing solar power generation costs in line with other conventional power generation sources. Particularly, with respect to CSPs, current high temperature energy storage fluids such as molten salts are relatively limited in terms of their thermal energy storage capacity. There is therefore a critical need to develop advanced high temperature fluids ("HTFs") and thermal storage systems to reduce the costs and improve efficiencies. Current HTFs, such as synthetic oils, have low thermal conductivity and limited thermal energy storage capacity. It has been demonstrated in recent years that addition of solid nanomaterials to various fluids can increase the thermal conductivity, density, and heat transfer coefficient of nanofluids by tens of percent.

Nanoparticles of functional materials, such as phase change materials ("PCM"), can contribute additional thermal energy storage capacity through the latent heat of solid/liquid or solid I/solid II transformations. Encapsulated in thermally stable and chemically inert shells, PCM nanomaterials dispersed in HTF nanofluids can increase volumetric thermal storage capacity. Studies of micron-sized encapsulated phase change materials have been conducted previously for low temperature heat transfer fluids. The micron sized PCM did not perform well under repeated cycling. The larger particles were often crushed during pumping, and the phase change of the PCMs was frequently incomplete due to the poor thermal conductivity. Consequently, there is a great need for developing articles and methods for storing energy collected by any means, such as for example, by solar energy methods.

SUMMARY OF THE INVENTION

In one aspect of the invention, coated Zn nanoparticles can be added to an alkali chloride salt eutectic as a phase change material for enhanced thermal energy storage. Zinc nanoparticles (600 nm to about 5 micrometers) obtained from a commercial source can be coated with organic molecules. Thermal cycling tests provide a coated Zn nanoparticles with good thermal stability and chemical inertness to alkali chloride salt eutectic during the test cycles (200 heating/cooling cycles) in $N_2$ and in air atmospheres. The volumetric enhanced thermal energy storage of the composite (coated Zn nanoparticles/alkali chloride salt eutectic) over the base alkali chloride salt eutectic is about 35 to 40%. Elemental mapping of the cross-sectional view of coated Zn nanoparticles from the composite after thermal cycles showed no signs of oxidation. In another aspect of the invention, nanometer sized PCM were used and had significant advantages as compared with micron sized PCMs. PCMs have higher effective heat capacity due to their higher phase change efficiency and they are less restrictive to flow. In addition, PCMs are less expensive to process when fluid based synthesis approaches are used. Therefore addition of encapsulated PCM nanoparticles with a phase change occurring in a HTF's working temperature regime should provide dual advantages: (a) increased thermal conductivity of a HTF that translates to higher heat transfer coefficient and (b) enhanced volumetric thermal storage capacity of the HTF by latent heat of PCM.

The core/shell nanomaterials synthesized and tested herein were designed for optimum working temperature range of about 200-250 C with Therminol 66 base heat transfer fluid (maximum use temperature of about 345° C.). The core metallic Sn was selected due to the melting point at about 232 C and a latent heat of fusion of 60 J/g, while the known stability of silica shell in wide range of temperatures was selected to provide the containment of the melted tin core. Recent advanced in synthetic chemistry allow synthesis and manipulation of a wide variety of materials at the nanometer scale. Various materials processing techniques such as sol-gel and thermal decomposition are available to produce core/shell nanostructures.

Advantageous articles of manufacture were also obtained by adding core/shell $Sn/SiO_2$ phase change nanoparticles ($Sn/SiO_2$ PCNPs) to the synthetic heat transfer fluid Therminol 66 (TH66). The effects of the $Sn/SiO_2$ PCNPs concentration on thermal conductivity, viscosity, and total heat adsorption of the nanofluid suspensions were investigated. Thermal stability of core/shell nanoparticles was also investigated by multiple heating and cooling cycling and analyzing the morphological changes in PCNPs. In a further aspect of the invention, nanofluids were engineered by stably dispersing nanometer-sized solid particles in conventional heat transfer fluids at relatively low particle volume concentrations to enhance the thermal conductivity and the heat transfer coefficient. In a particular aspect of the invention, hybrid copper decorated graphene suspensions utilize plasmonic and percolation heat transfer mechanisms to advantage and were able to dramatically boost cooling efficiency.

These and other objects, advantages, and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF PREFERRED EMBODIMENTS

Figures 1A, 1B, 1C:
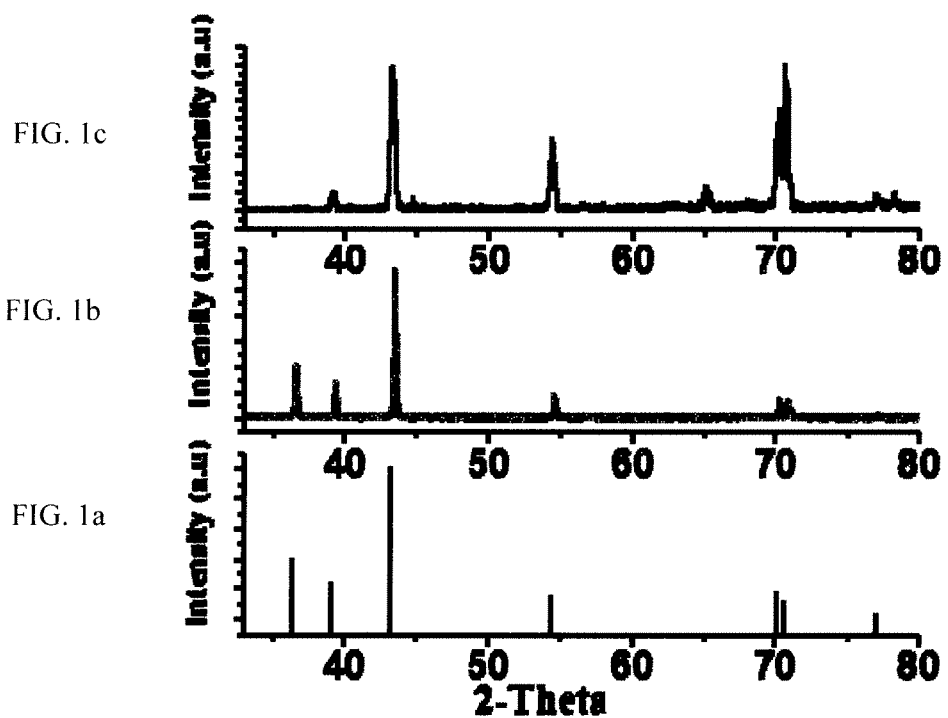
FIG. 1a shows an X-ray diffraction pattern of as-received zinc nanoparticles with all the characteristic zinc peaks for PDF of Zn card.
FIG. 1b shows the pattern for 600 nm size particle and FIG. 1c shows the pattern for 5 micron size zinc particles.

In one preferred embodiment a method and articles of manufacture provide efficient storage of heat energy by concentrated solar power plants ("CSP" hereinafter). In this embodiment a combination is provided of a high temperature heat transfer material with inclusion of particular types of nanoparticles and also using phase change materials ("PCM" hereinafter) which greatly amplify the ability to efficiently store energy. Storage of thermal energy in the form of latent heat in phase change materials (PCM) is found to be attractive for low and medium temperature range applications. Addition of PCMs can contribute additional thermal energy storage (TES) capacity through the latent heat of solid/liquid or solid I/solid II transformation. The heat transfer can be improved by use of a phase change material (PCM) to transfer energy to steam including the using of composite materials based on highly conductive graphite. Further, encapsulation methodologies were found to increase the heat transfer surfaces. Several metal PCMs such as Li, Sn, In, Ga and eutectic alloys have been evaluated and the generic usefulness of such features shown. However, the use of encapsulated phase change material (EPCM) for high temperature thermal applications such as in CSP is also advantageous. Addition of EPCM nanomaterials to heat transfer fluids (HTF) with a phase change occurring in a fluid's working temperature region offers dual advantages: (a) increased specific heat of a HTF and (b) enhanced thermal storage capacity of the HTF by latent heat of PCM melting.

Encapsulated Zn Nanoparticles Dispersed in Eutectic Salt.

Thermal stability of coated Zn nanoparticles was determined by thermal cycling (200 heating and cooling cycles) in nitrogen and in air atmosphere and secondly, the benefits determined for adding coated Zn nanoparticles to the high temperature alkali chloride salt eutectics for CSP thermal storage applications. The effects of coated Zn nanoparticles size (600 nm and 5 vt) and total heat adsorption of nanoparticles and their suspensions were also established.

Zinc (Zn) was selected as a PCM because the melting temperature of Zn falls in the working range (350-500° C.) of a typical thermal energy storage salt formulations; and it has high heat of fusion (113 J/g) value. Commercial Zn nanoparticles of sizes 600 nm ("small") and 5μ ("big") were coated with an organic material which is chemically inert to alkali chloride salt. These composites were dispersed in chloride salt eutectic at various volumes loading, and the thermal analysis was carried out using differential scanning calorimetry.

Zinc nanoparticles of two different sizes (<600 nm (small) and 5-10μ (big) were obtained from Sigma Aldrich and their purity was 99%. The containers of the Zn nanoparticles were opened in a glove box containing nitrogen gas, and a small stock of each sample was used to characterize the as-received particles. The powder X-ray diffraction (PXRD) patterns of as received Zn nanoparticles were recorded by a Bruker D8 X-ray diffractometer with Cu $K_\alpha$, radiation. The samples were scanned from 2θ of 20 to 80° at increments of 1°/min. The average particle size were estimated using the dynamic light scattering (DLS) technique at a 90° scatter angle with a 90 plus/BIMAS particle analyzer (Brookhaven Instrument Corp, NY).

Morphology of as-received Zn nanoparticles were obtained from scanning electron microscopy (SEM) and transmission electron microscopy (TEM) (Philips CM 300). The electron dispersive X-ray spectrometer (EDS) data was obtained on the SEM instrument (Hitachi Model-4700-II, Tokyo, Japan). The samples were prepared by placing a drop of dilute ethanol suspension of nanoparticles onto a silicon wafer (for SEM) or on to a porous carbon coated copper grid (for TEM) and allowed to dry before examination. Elemental mapping of composite after thermal cycling was examined using SEM and the focused ion beam (FIB) technology was used to prepare the cross-sectional view of EPC Zn nanoparticles.

A differential scanning calorimeter (DSC) Q-20 (TA Instruments) was used to measure the specific heat, heat of fusion, melting and crystallization of as-received zinc, encapsulated Zn and the composite with various % volume loadings of EPC Zn nanoparticles. The purge gases used are nitrogen and air. Before the experiments the instrument was calibrated against the melting point and enthalpy of melting of indium and tin. All tests were conducted using a custom temperature program created by following the standard DSC test method (ASTM-E1269).

Alkali chloride salt eutectic materials were obtained from the Department of Mechanical Engineering, Texas A&M University; and trioctyl phosphine oxide (TOPO) reagent plus 99% was obtained from sigma Aldrich. Coating of zinc nanoparticles with TOPO was carried out by the addition of an appropriate amount of TOPO to Zn-nanoparticles, followed by slow melting of TOPO on to the Zn surface. All sample preparation procedures were carried out inside the glove box.

The XRD patterns (see FIGS. 1a-1c) of as-received Zn nanoparticles (small and big size particles) exhibit prominent X-ray diffraction peaks at scattering angles 2(θ) of 36.2, 38.9, 43.2, 54.3, 70.07 and 70.6 degrees. No peaks of oxide impurities were observed in XRD pattern confirming that the obtained Zn nanoparticles are phase pure.

Figure 2A:
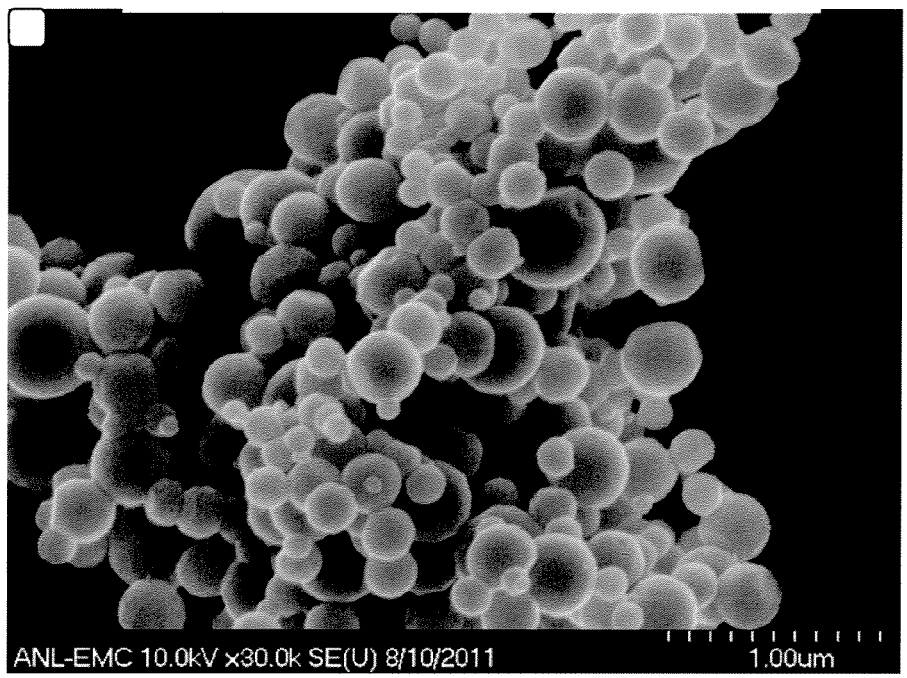
FIG. 2a shows a scanning electron microscopy image of ~600 nm size as-received Zn nanoparticles and FIG. 2b shows ~5μ sized as-received Zn nanoparticles, with the particles in FIGS. 2a and 2b being spherical in shape.
Figure 2B:
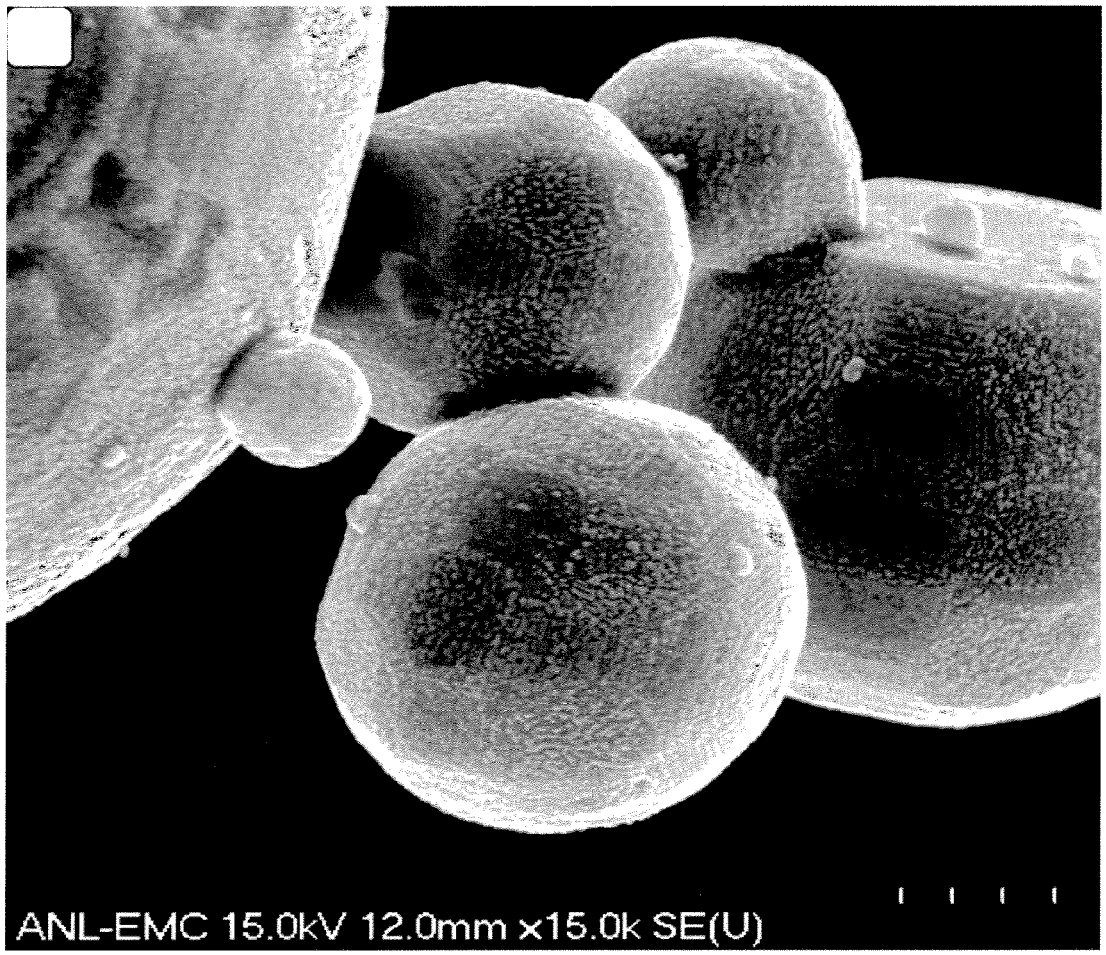
Figure 3A:
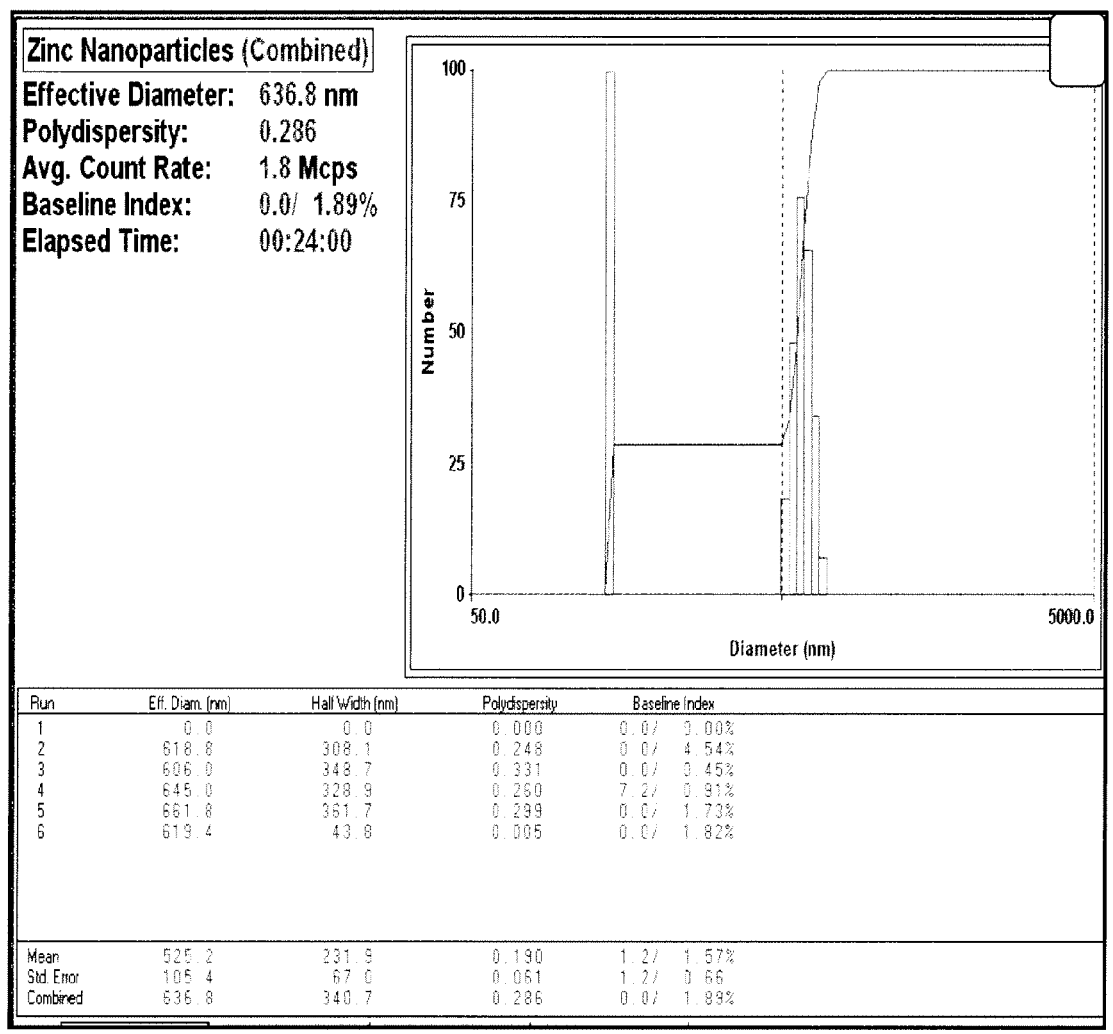
FIG. 3a shows dynamic light scattering of the as-received small Zn nanoparticles with an average size above 600 nm and FIG. 3b shows large size particles of about 5μ.
Figure 3B:
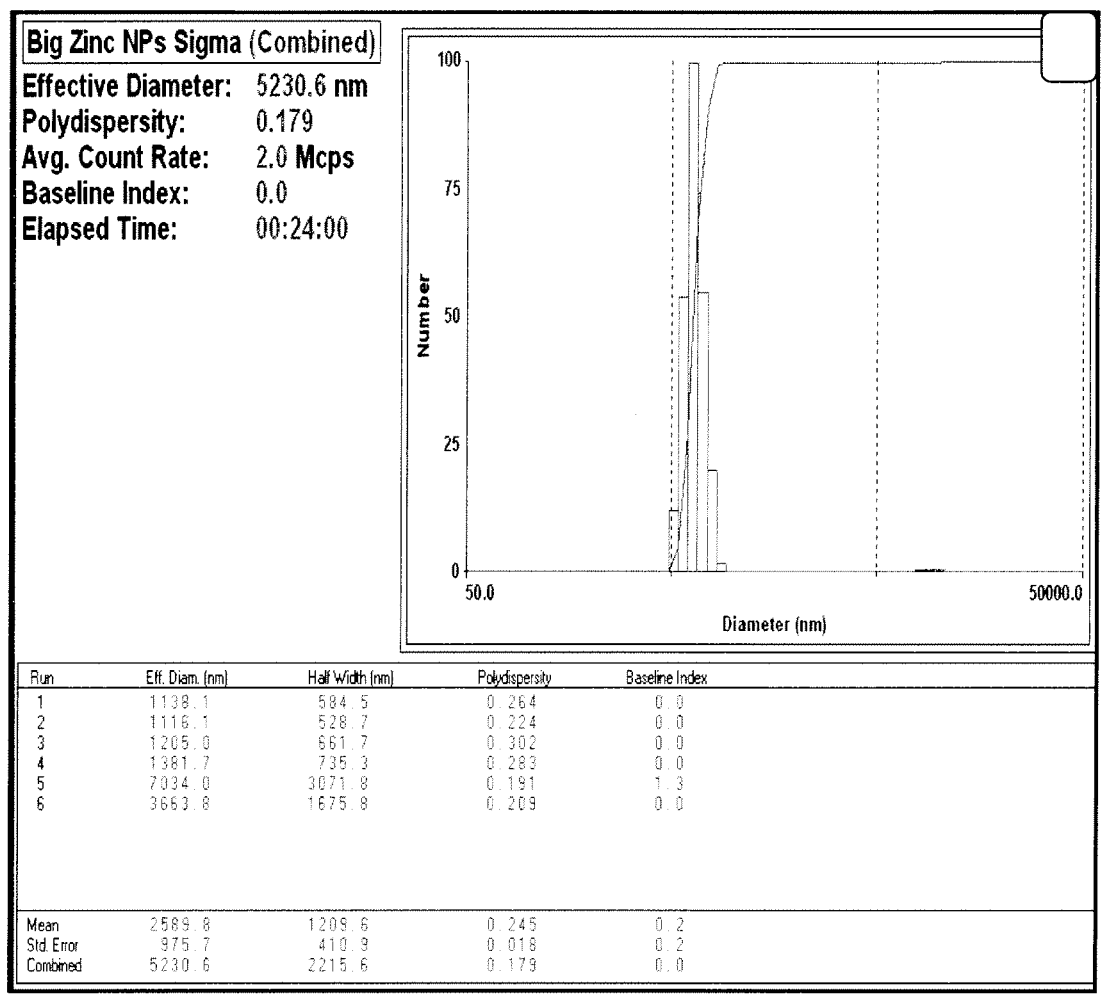

The as-received Zn nanoparticles (small and big) are spherical in shape as could be seen from the SEM images (see FIGS. 2a and 2b). The average size of small particles was around 600 nm and big particles was around 5μ, which is in good agreement with the data obtained from DLS measurements (see FIGS. 3a and 3b).

Figure 4:
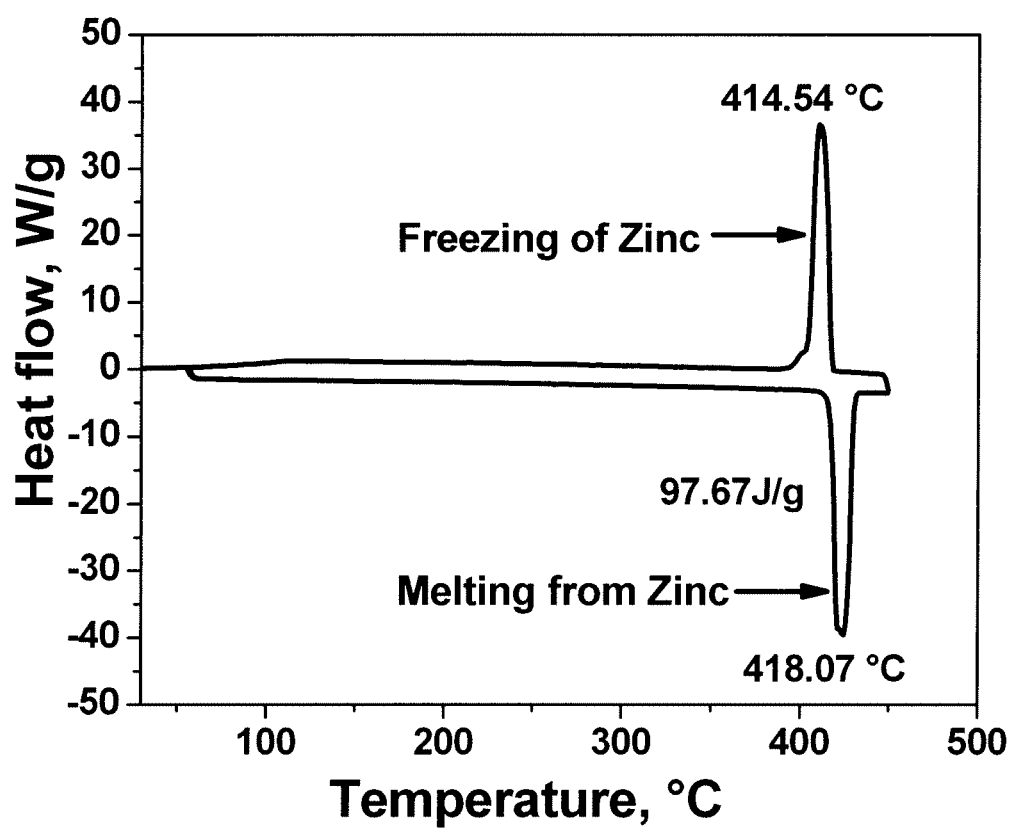
FIG. 4 shows a typical DSC graph of as-received Zn nanoparticles showing melting and freezing curves.

The melting and freezing temperature, latent heat of fusion of as-received Zn nanoparticles, coated Zn nanoparticles and coated Zn nanoparticles in alkali chloride salt eutectic at various volume % loadings have been studied calorimetrically. The melting and freezing of as-received Zn nanoparticles was observed at 418.07° C. and freezes at 414.54° C. (FIG. 4), which is slightly lower than the reported freezing point value for bulk Zn metal (419.6° C.). The measured latent heat of fusion of as-received Zn nanoparticles was found to decrease from 97.35 J/g to 44.35 J/g (FIG. 5) and 103 J/g to 86 J/g (FIG. 6) for 600 nm and 5 size particles respectively after 10 thermal cycles in air. These values are lower than that of the bulk value reported for Zn metal (112 J/g). The difference could be related to the overall surface area of the nanoparticles exposed to oxygen either before or during the thermal cycles. As particle size decreases the surface area increases, so did the increase in surface oxidation zinc.

Trioctylphosphine oxide (TOPO) is an organophosphorous compound which contains three octyl carbon chains resulting in local trigonal symmetry, and has a large permanent dipole moment from the P=O bond. In industry it has been widely used as a ligand for the extraction of various metals, it acts as a solvent and capping molecule in the synthesis of a wide range of nanoparticles and semiconductor nanocrystals like CdSe quantum dots. It has the ability to form self-assembled monolayers ("SAMs"); and at higher concentration it forms multilayered structures and protects nanomaterials from oxidation.

Figure 6:
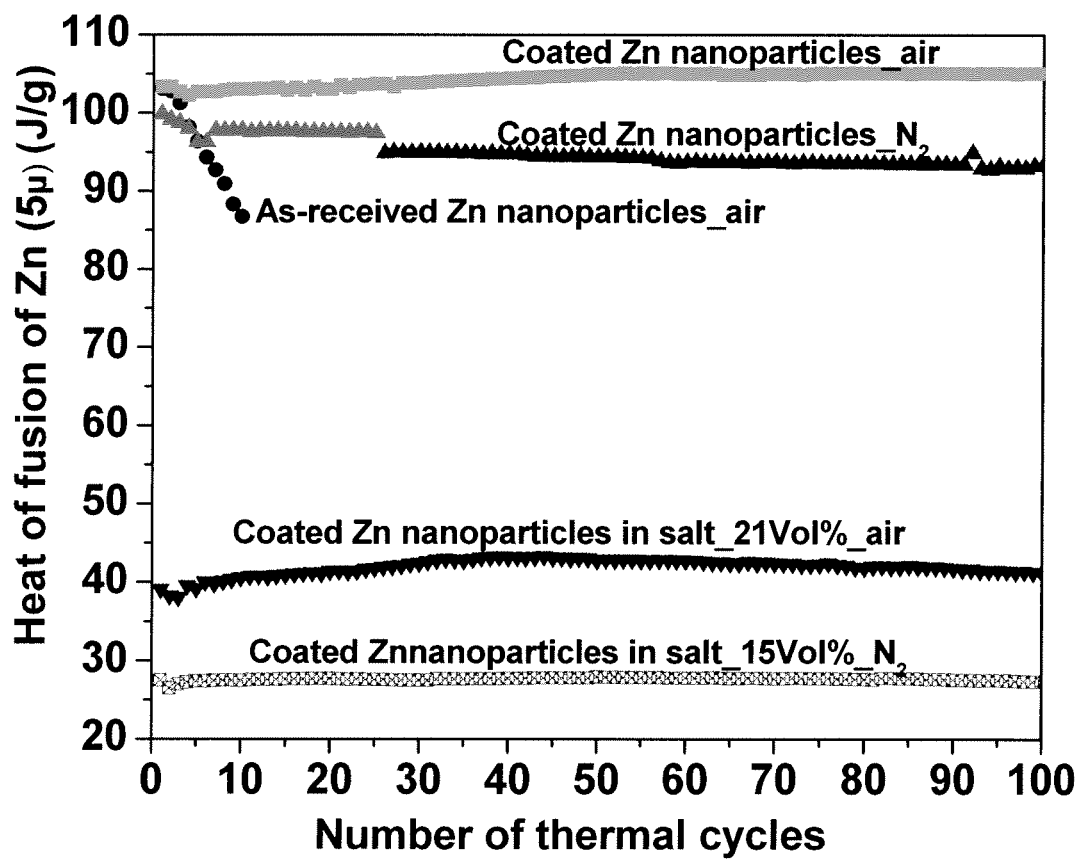
FIG. 6 shows latent heat of fusion of various 5 u size Zn samples in $N_2$ and in an air atmosphere over 100 thermal cycles.
Figure 7A:
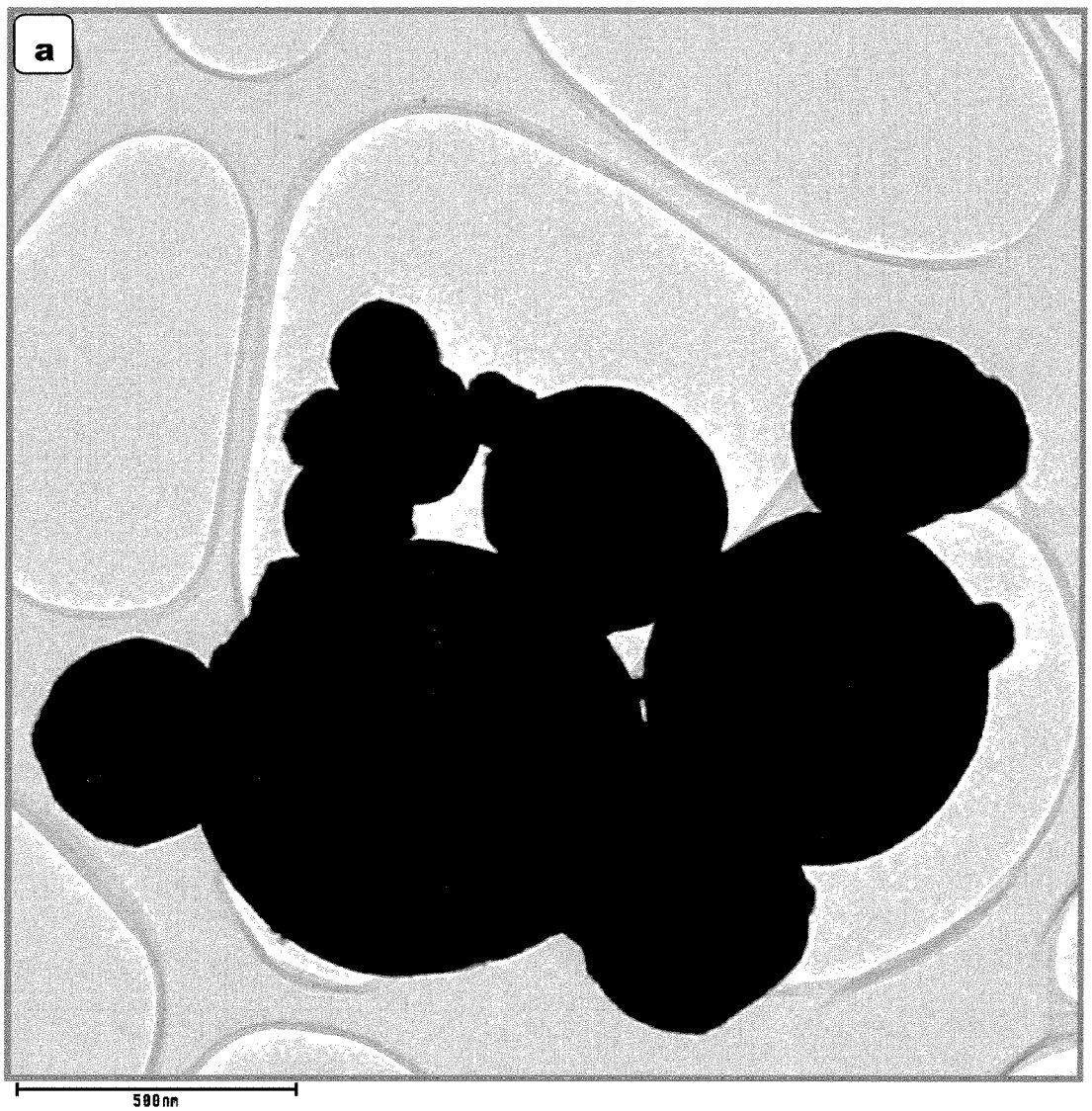
FIG. 7a shows a TEM image of a composite of TOPO coated Zn nanoparticles before thermal cycling and FIG. 7b a TEM image after 20 thermal cycles of the composite.
Figure 7B:
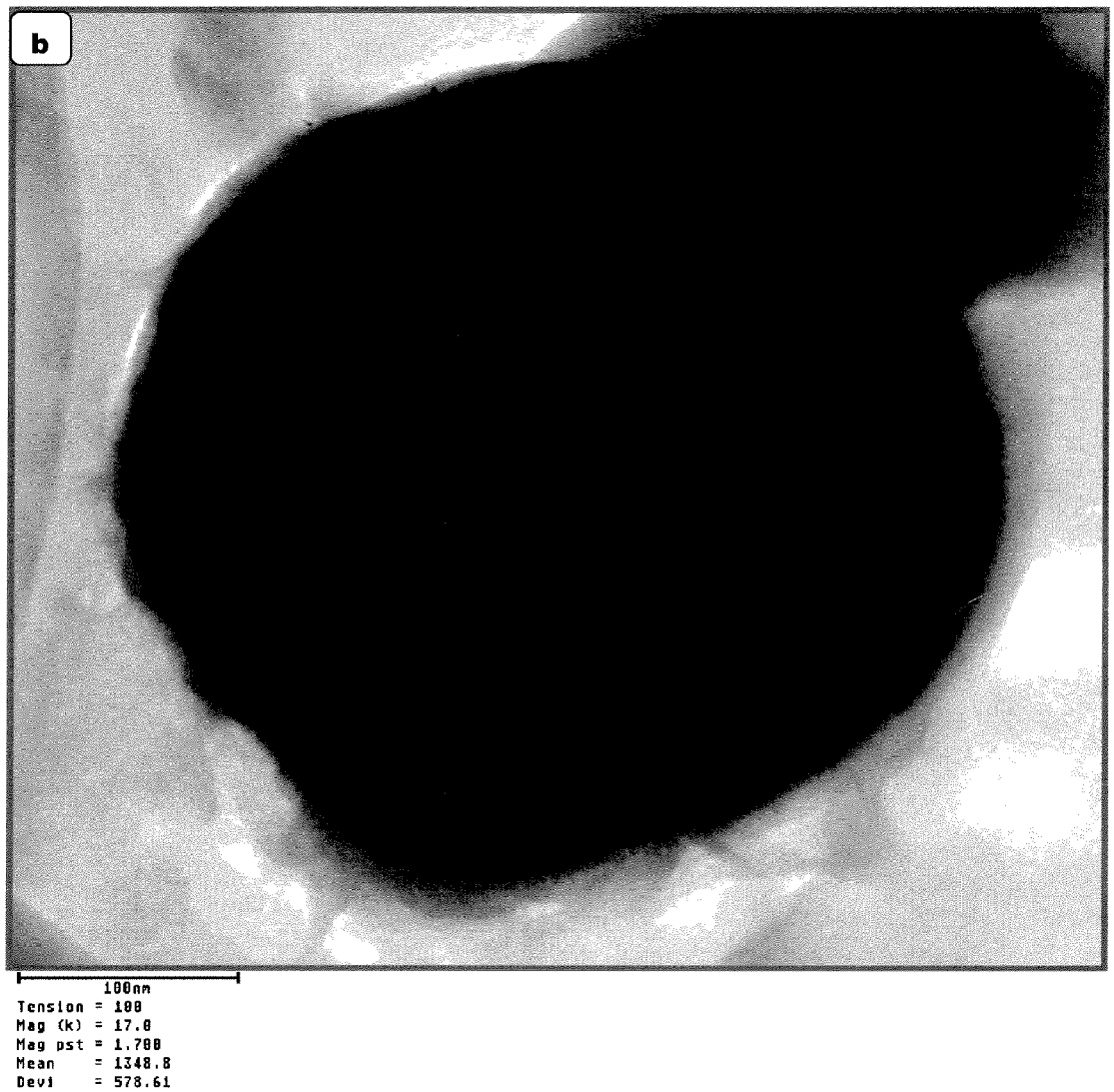

As-received Zn nanoparticles were coated with an appropriate amount of TOPO inside the glove box. Thermal and chemical stability of coated Zn nanoparticles have been studied calorimetrically. Stable heat of fusion values have been achieved by use of coated particles (both 600 nm and 5μ particles) in both $N_2$ and in an air atmosphere. Further, these particles were also stable in alkali eutectic salts at least over the studied thermal cycles (200). For consistency, only data of 100 thermal cycles are presented in FIG. 5 and FIG. 6. The TEM images of coated Zn nanoparticles before (see FIG. 7a) and after (see FIG. 7b) thermal cycles show no changes in the morphology of the particles; and FIB cross-sectional view shows no sign of oxidation.

Figure 5:
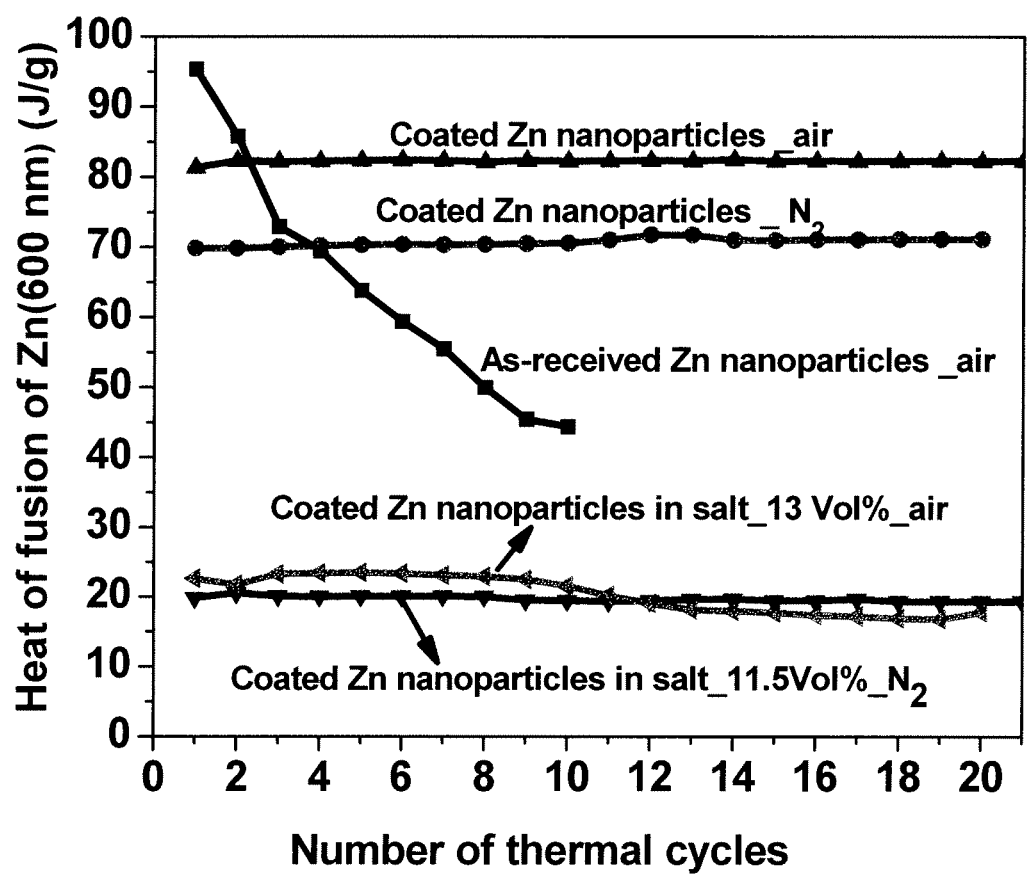
FIG. 5 shows latent heat of fusion of various 600 nm size Zn samples in $N_2$ and in an air atmosphere over 20 thermal cycles.

The latent heat of fusion value obtained for coated 600 nm Zn particles was 70 J/g and 82 J/g in $N_2$ and in an air atmosphere (see FIG. 5). When the amount of TOPO was accounted for, the latent heat of fusion value was in good agreement with the measured latent heat of fusion value (97 J/g) of as-received Zn nanoparticles. For coated 5μ size Zn nanoparticles, this value was found to be stable at 97 J/g and 103 J/g in $N_2$; and in an air atmosphere respectively (see FIG. 6). To further demonstrate the chemical and thermal stability of these coated 5μ size Zn nanoparticles, these nanoparticles were added to the alkali eutectic chloride salt at different volume loadings and repeated thermal cycles (200) were carried out in both $N_2$ and in an air atmosphere. Stable latent heat of fusion values (41 J/g at 21 Vol % in $N_2$ and 27 J/g at 15 Vol % in air) were obtained; and this value is stable over studied thermal cycles.

Figure 8A:
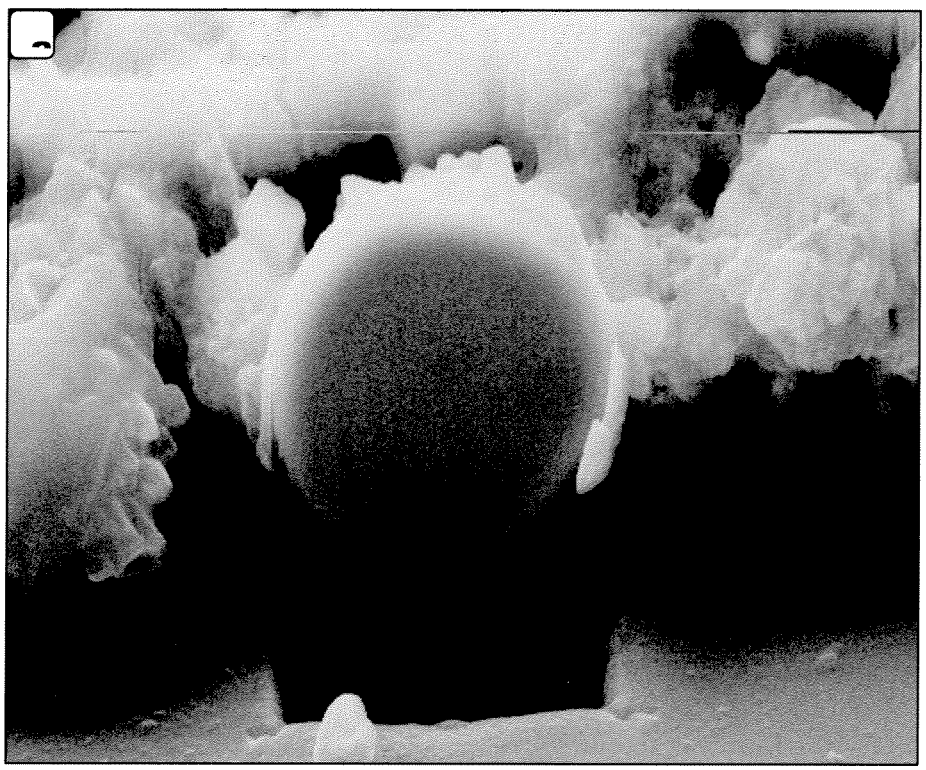
FIG. 8a shows an SEM image of composite after 200 thermal cycles in nitrogen atmosphere with FIB-sliced Zn nanoparticles.
Figure 9A:
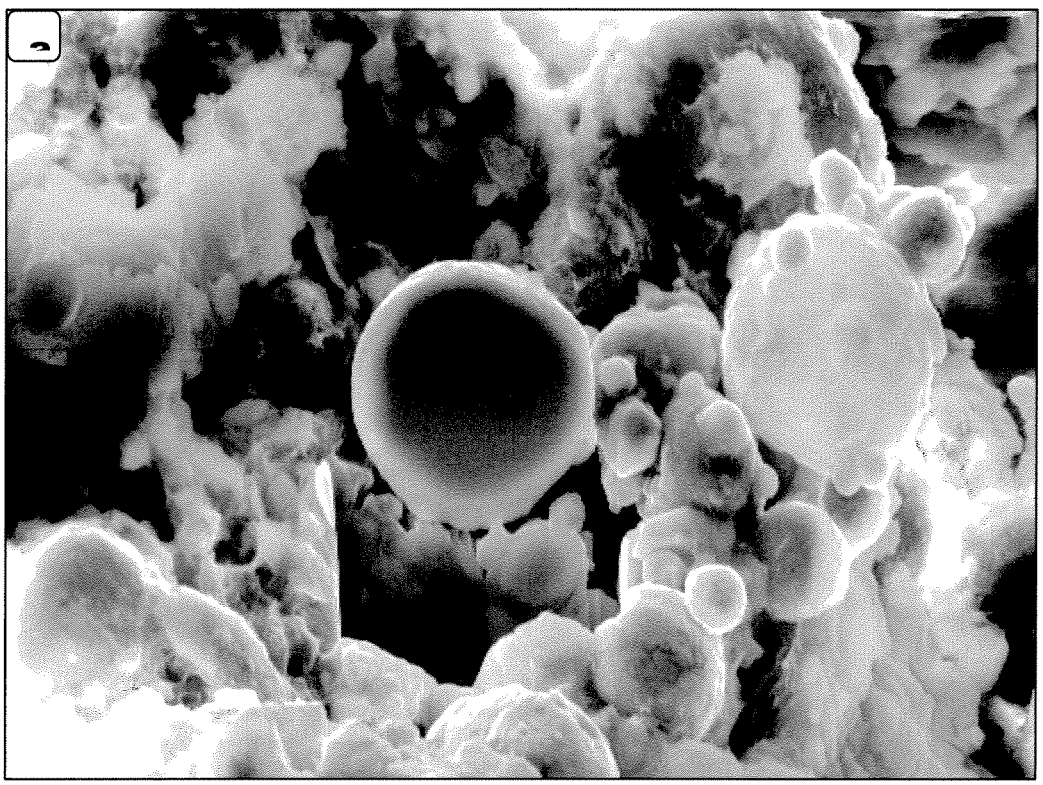
FIG. 9a shows an SEM image of a composite after 200 thermal cycles in air atmosphere with FIB-sliced Zn nanoparticles.

FIGS. 8a and 9a show the SEM image of FIB cross-section of coated Zn nanoparticle after 200 thermal cycles of composite in $N_2$ and in air atmosphere. The FIB cross-sectional view of coated Zn nanoparticles shows no change in the particle morphology, densification of particle, and aggregation. Further, there is no observable effect on surface oxide.

Figure 8B:
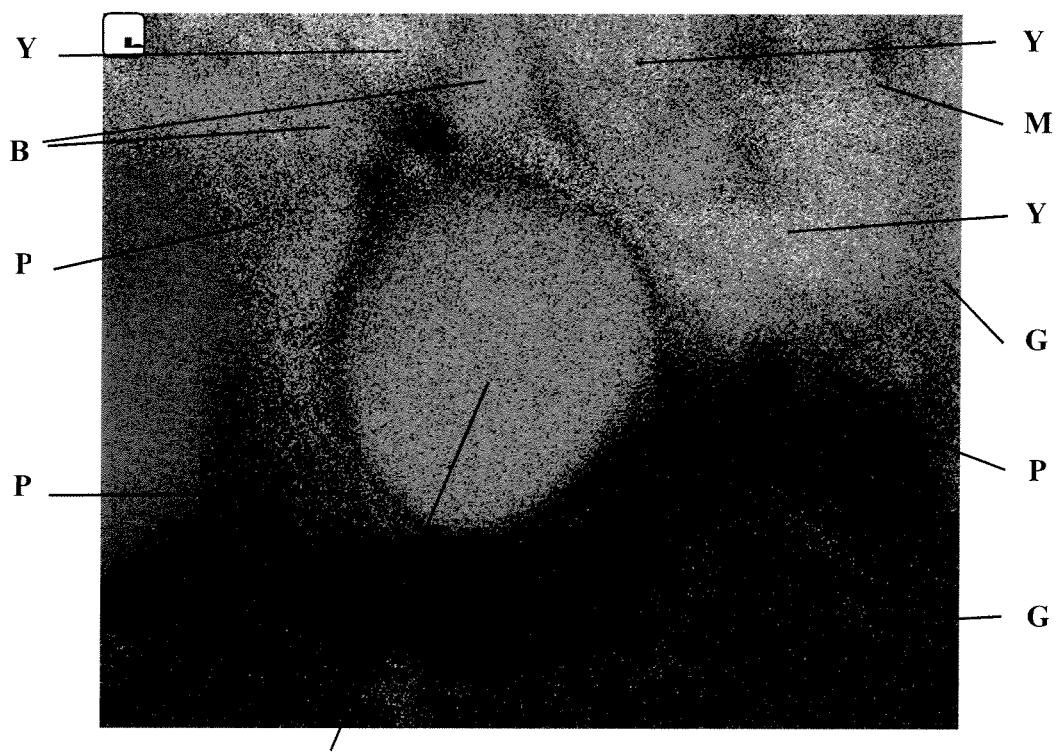
FIG. 8b shows a corresponding elemental mapping (Color code: Zn-"R", O-"Y", Al-"G", Cl-"B", Ca-"P" and Ba-"M")
Figure 9B:
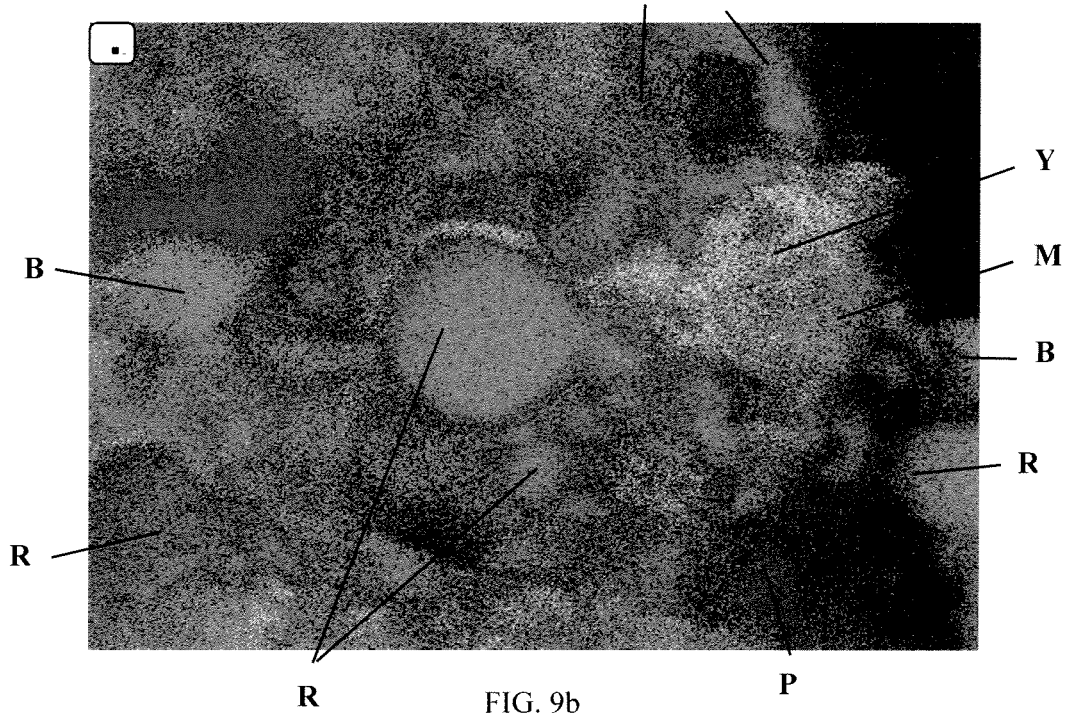
FIG. 9b shows a corresponding elemental mapping, (Code: Zn-"R", O-"Y:, Al-"G", Cl-"B", Ca-"P" and Ba-"M")

Elemental mapping of corresponding cross-sectioned particles shows in FIGS. 8b and 9b show different elements (O-"Y", Cl-"B", Ca-"P", Al-"G", Ba-"M" and Zn-"R") that are present in the composite. Calcium, barium and chlorine are from the eutectic salt, aluminum is from the DSC aluminum pan; and the trace amount of oxygen found next to the Al could be from the oxidation of aluminum to alumina. No significant amount of oxygen was seen around the Zn surface from both thermal cycled samples (composites DSC run in $N_2$ and in air). It is clearly evident from the SEM and elemental mapping that the coated particles are thermally and chemically stable; and these results supports the stable heat of fusion value. However, particles without coating showed considerable change on the surface texture upon thermal cycles in air atmosphere, which could be due to surface oxidation and densification during thermal cycles.

Figure 10:
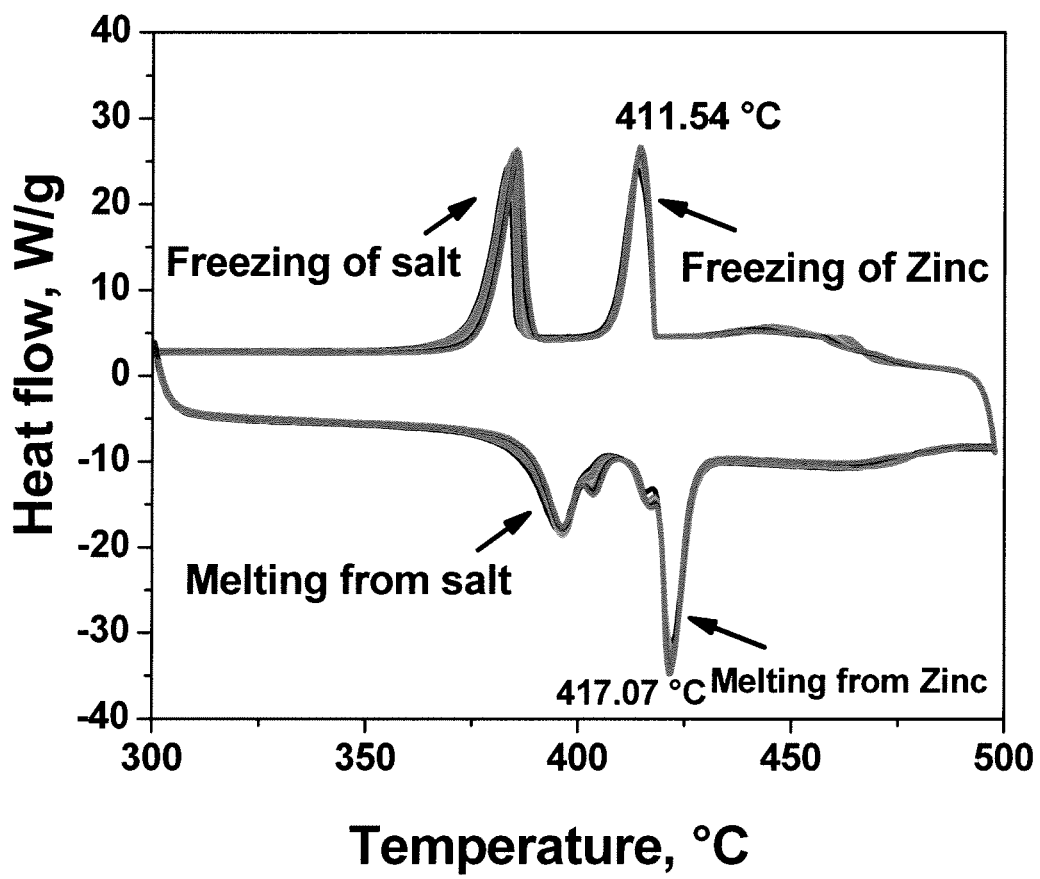
FIG. 10 shows a DSC graph of TOPO coated Zn nanoparticles at 11.04 vol % loading in alkali chloride eutectic salt with repeated heating and cooling cycles.

The total heat observed by coated Zn nanoparticles in eutectic alkali chloride salt eutectic (composite) was studied by thermal cycling between 300° C. and 500° C. FIG. 10 shows a typical DSC graph for the composite. The two melting and two freezing peaks are from the alkali chloride salt eutectic and coated Zn nanoparticles.

The effective specific heat ($C_{p(composite)}$) and density ($\rho$ composite) of the composite at various temperatures were calculated using the rule of mixtures (Eq. 1 & 2), and total volumetric heat capacity was calculated using Eq. 3:

Effective Specific Heat:

$$C_{p(nf)} = \frac{(1-\varphi_{np})C_{p(F)}\rho_F + \varphi_{np}C_{p(np)}\rho_{np}}{(1-\varphi_{np})\rho_F + \varphi_{np}\rho_{np}} \quad (1)$$

Effective Density of Nano Composite:

$$\rho_{nf} = \phi_{np}\rho_{np} + (1-\phi_{np})\rho_F \quad (2)$$

Volumetric Heat Capacity:

$$\Delta Q_{PCNF} = \rho_{nf}C_{p(nf)}\Delta T + \phi_{np}\rho_{np}\Delta H_{f(PCNP)} \quad (3)$$

Where $C_{p(nf)}$ is specific heat capacity of mixture (nanoparticles+eutectic salt), $C_p(F)$ is specific heat of base salt, $C_{p(np)}$ is the specific heat of Zn nanoparticles, $\theta_{np}$ is volume fraction of coated nanoparticles, $\rho_p$ is density of base salt, $\rho_{np}$ is density of Zn nanoparticles, $\rho_{nf}$ is the effective density of mixture, $\Delta T$ is the difference in temperature measured from $T_1$ to $T_2$ (° C.), and $\Delta H_f$ (PCNP) is the heat of fusion of Zn NPs.

The measured specific heat of alkali chloride salt eutectic in $N_2$ atmosphere ranged from 1.07 J/g*K at 350° C. to 1.17 J/g*K at 550° C. It has an endothermic and exothermic peak at 395° C. and 385° C., respectively, and the temperature difference between melting and freezing is 10° C. (see FIG. 10). The specific heat of coated nanoparticles was assumed to be constant in the given range of temperatures (350° C.-500° C.).

Figure 11:
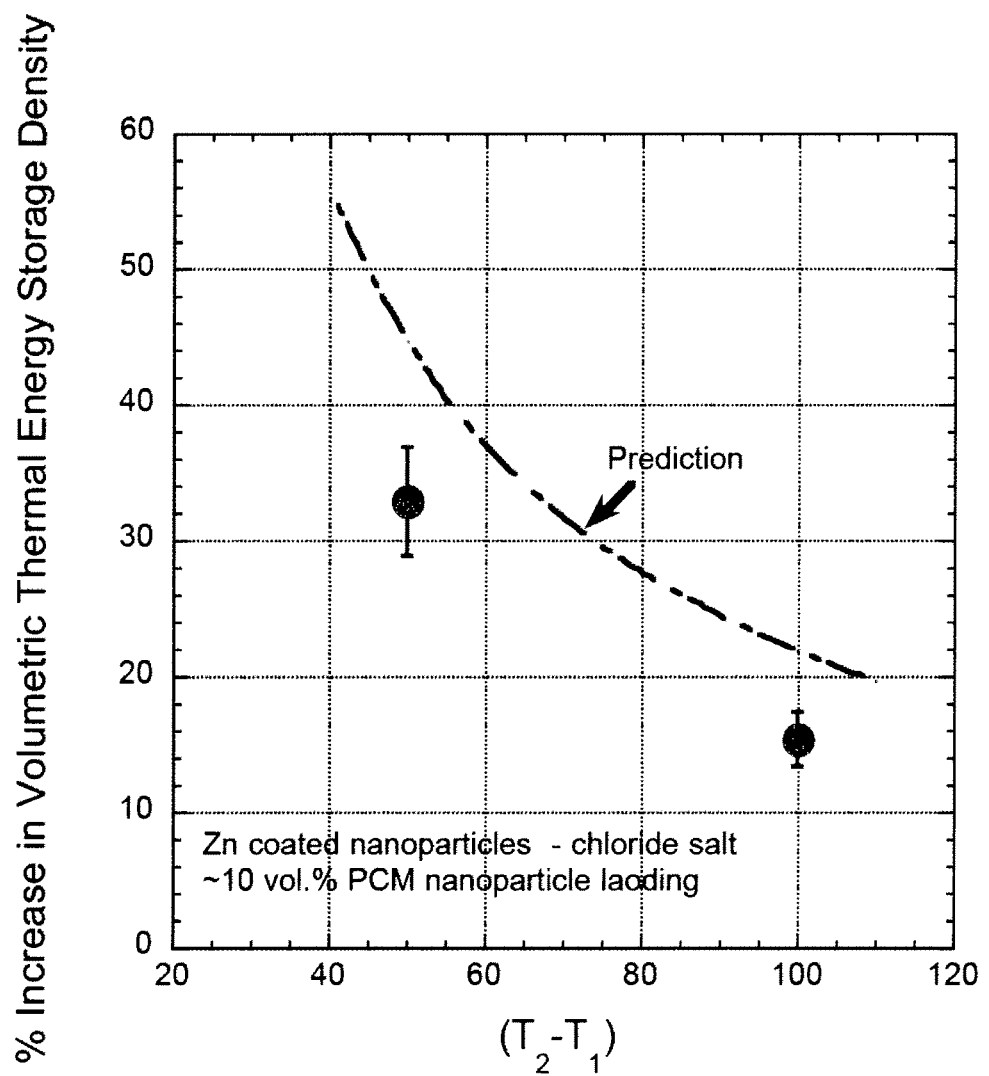
FIG. 11 shows an average % increase in volumetric Thermal Energy Storage (TES) density for 10 Vol % loading of Zn in a salt eutectic as a function of the temperature range the composite fluid is cycled (ΔT)

A typical DSC graph of composite is shown in FIG. 10 with two endo and two exothermic peaks. The endothermic peaks at 395° C. and 418° C. corresponds to the melting from the salt and Zn. The two exothermic peaks at 385° C. and 414.54° C. correspond to the freezing of salt and Zn. The measured specific heat of composite with 8.5 vol % of Zn nanoparticles loading was 1.072, 0.889, 0.907 J/g*K at 450, 475, and 495° C. respectively for the 1st cycle. The calculated specific heats at the corresponding temperature are 1.073, 1.047 and 1.024 J/g*K. The difference between the measured and the calculated values was found to be 0 to 18%. After 20 cycles the specific heat value was found to be 0.921, 0.874 and 0.854 J/g*K; and the difference between the measured and calculated value is 16 to 20%. The difference could be a combination to both the experimental error and the property variation from batch to batch preparation for alkali chloride salt eutectic. The average heat of fusion of Zn was measured to be 17.63 J/g; and the calculated value is 22.11 J/g. FIG. 11 shows average % increase in volumetric TES density for 10 Vol % loading of Zn in alkali chloride salt eutectic as a function of the temperature range the composite fluid is cycled ($\Delta T$). The line curve is the predicted value (per Eq. 3) based on the measured specific heat of alkali chloride salt eutectic, density of alkali chloride salt eutectic and Zn nanoparticles, and the measured heat of fusion of encapsulated Zn. The volumetric TES enhancement is strongly dependent on the temperature range over which the composite fluid is cycled. It should be noted that smaller the ($\Delta T$), the effect of % increase in volumetric TES storage is higher. $\Delta T$ increases specific heat of the composite fluid (sensible heat) and is more dominant than the heat absorption from heat of fusion of the melting Zn nanoparticles. The predicted increase in volumetric thermal energy storage capacity $\Delta Q_{PCNF}$ of alkali chloride salt eutectic with 10 vol, % of coated Zn is ~40% for the ($\Delta T$) temperature range of 50° C. and the measured value is 35%. The difference is within the experimental scattering. Thus, the total volumetric thermal energy storage of the 10 vol % loading of coated Zn nanoparticle's show increased TES storage by about 35%.

Thermal stability of as-received Zn nanoparticles was achieved by organic coating. Further, coated Zn nanoparticles were found to be chemically inert to alkali chloride salt eutectic. Addition of 8-11 vol % loading of coated Zn nanoparticles to salt eutectic will increase thermal storage capacity over the base salt eutectic. Elemental mapping of coated Zn nanoparticles, stable heat of fusion value, absence of oxide layer over coated nanoparticles from the FIB cross-section value supported the stability of coated Zn nanoparticles over repeated thermal cycles in both $N_2$ and in an air atmosphere.

Encapsulated Tin Nanomaterials in Organic Heat Transfer Fluid

Tin nanoparticles were synthesized using a modified polyole wet-chemical reduction process. In a typical synthesis, 15 g of polyvinylpyrrolidone (PVP, MW 40000), Sigma Aldrich) was dissolved in 250 mL of tetraethylene glycol (TEG, 99%, Sigma Aldrich) and heated to 140 C using a heating mantle. At 140° C., $SnCl_2$ solution (5 g in 50 mL of TEG) was added slowly. The PVP solution turned yellow-brown after addition of the $SnCl_2$ solution. Ten minutes later, a freshly prepared $NaBH_4$ solution (15 g of $NaBH_4$ (99% Sigma Aldrich) in 200 mL of TEG) was added drop-wise to the reaction solution. The color of the reaction mixture quickly turned to a pale yellow, then to black, and finally to gray upon continued addition of the $NaBH_4$ solution. After 90 minutes, heat was removed; and the solution was brought to room temperature. The entire synthesis was carried out with constant magnetic stirring under the protection of an $N_2$ atmosphere. The tin nanoparticles were washed three times with ethanol and separated by centrifuging. The separated tin particles were immediately subjected to encapsulation with silica coating. PVP was used as a capping agent for the nanoparticles and as an organic template for forming the mesoporous silica coating via base-catalyzed hydrolysis of tetraethyl-ortho-silicate (TEOS).

For silica coating, tin nanoparticles (~2.9 g, ~95% yield) were dispersed in 800 mL of ethanol and sonified for 1 hr in a water bath. During the sonication, the suspension temperature increased to 40° C. The flask with nanoparticle suspension was transferred onto a magnetic stirring plate and 1 mL of TEOS (99.9%, Alfa Aesar) was added drop by drop under vigorous stirring. After 45 minutes of stirring, 25 mL of ammonium hydroxide (Fisher Scientific) was added drop by drop to the reaction mixture and stirring continued overnight at room temperature. A wrap of aluminum foil was used to restrict the light source reaching the system to restrict photopolymerization in the reaction flask. The resulting core/shell $Sn/SiO_2$ nanoparticles were washed with ethanol and dried in a glove box under flow of nitrogen gas.

Morphology and elemental composition of uncoated tin nanoparticles and $Sn/SiO_2$ PCNPs was characterized using scanning electron microscopy (SEM) equipped with an electron dispersive X-ray spectrometer (EDS) (Hitachi, S4700) and transmission electron microscopy (TEM) (Philips, CM300). The samples were prepared by placing a drop of dilute ethanol suspension of nanoparticles onto a silicon wafer (for SEM) or a porous carbon coated copper grid (for TEM) and allowed to dry.

Powder X-ray diffraction (XRD) patterns of nanoparticles were recorded by a Bruker D8 X-ray diffractometer with Cu $K_a$ radiation. The samples were scanned from 2θ of 20° to 80° at increments of 1°/min.

Nanofluids were prepared by the addition of $Sn/SiO_2$ PCNPs at loadings 1-5 vol % to synthetic heat transfer fluid Therminol-66 (TH66®) (Solutia, Inc.). Benzalkonium chloride (Acros Organics) was used as a surfactant for dispersing the silica coated particles in TH66 as it was suggested for dispersing the silica nanoparticles in TH66 [5]. Surfactant was first dispersed into the base fluid (TH66), followed by addition of $Sn/SiO_2$ PCNPs. The mixture was homogenized by sonication using S-450 Branson Sonifier at ~80 W output power, and 40% duty cycle.

The effective thermal conductivity of TH66, TH66 with surfactant, and TH66 with surfactant and various loadings (1-5 vol. %) of $Sn/SiO_2$ PCNPs were measured using the transient hot-wire technique (KD2 Pro, Decagon Devices). The reported values represent the average of at least 20 measurements.

The viscosity of the nanofluids was measured as a function of temperature in the range between 15 and 135° C. using a Brookfield DV-II+ rotational type viscometer with the SC4-18 spindle (instrument error ~2%).

The total heat adsorption by nanofluids and pure materials were measured by differential scanning calorimeter (DSC, Q-20 by TA Instruments). The DSC instrument was calibrated using an indium standard with the measurements conducted under the flow of high purity nitrogen gas ($N_2$). The melting temperature and latent heat of fusion of both uncoated tin nanoparticles and core/shell $Sn/SiO_2$ PCNPs were measured first. The empty DSC hermetic aluminum pan and lid were weighed and then nanoparticles were loaded (~5 mg sample size) into the hermetic aluminum pan. The pan was crimp sealed inside a glovebox ($N_2$ atmosphere), re-weighed, and placed in the DSC sample holder. Prior to the measurement, the system was equilibrated at 35° C.; hearing and cooling cycles were between 35° C. and 250° C. at a rate of 10° C./min. For specific heat measurements of TH66 and $Sn/SiO_2$ nanofluids, a custom temperature program that follows the standard DSC test method (ASTM-E1269) as created: the temperature was equilibrated at 50° C. for at least 4 min to evaporate any absorbed moisture, then ramped to 285° C. at 10° C./min. and held isothermal for another 4 min. The cooling to room temperature was conducted at 10° C./min. rate.

Figure 12:
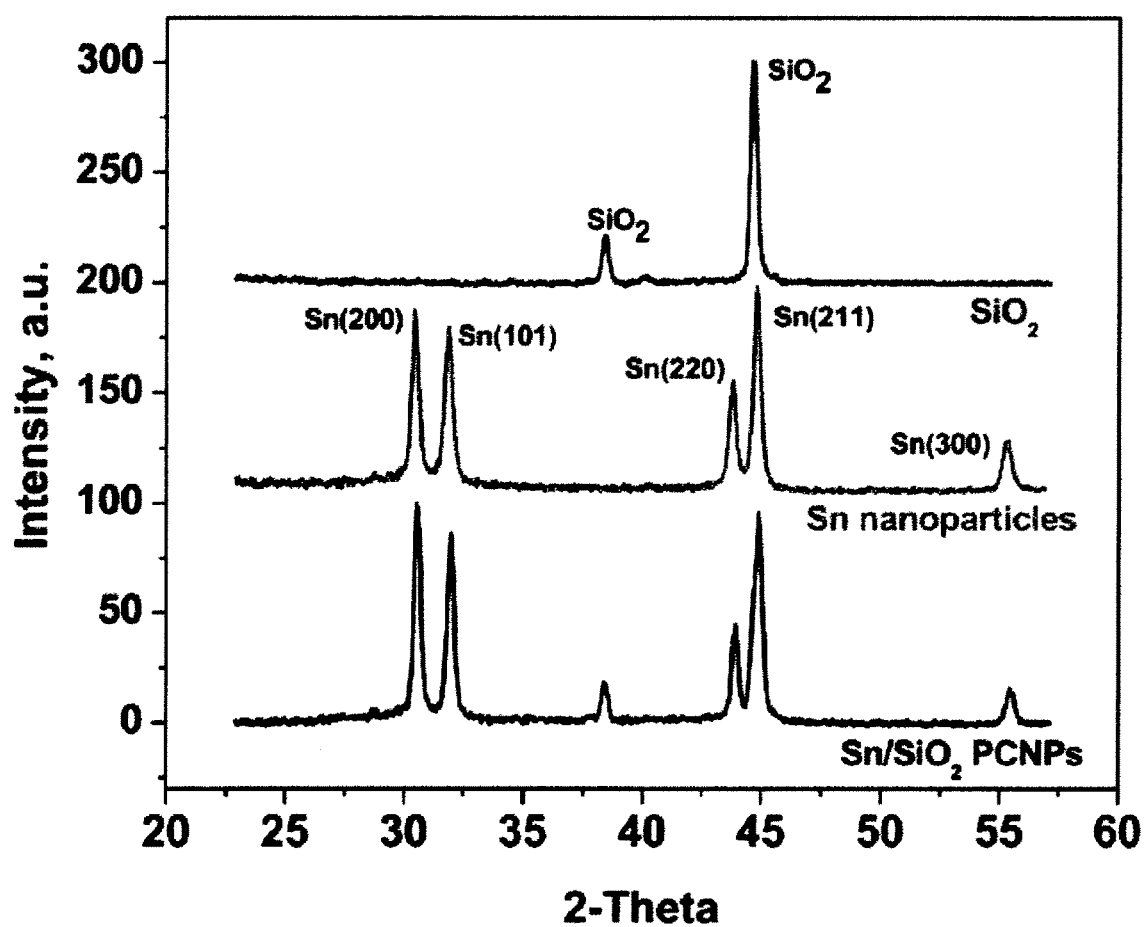
FIG. 12 shows X-ray diffraction patterns of as-prepared synthesized tin nanoparticles and silicon oxide coated $Sn/SiO_2$ core/shell nanoparticles.

The as-prepared tin nanoparticles synthesized by the polyole reduction process yielded a phase pure tin confirmed by powder XRD analysis (see FIG. 12, middle pattern). The XRD patters of as-synthesized tin nanoparticles exhibit prominent diffraction peaks characteristic for the body centered tetragonal crystalline phase of tin. The XRD spectra of core/shell $Sn/SiO_2$ nanoparticles (FIG. 12, bottom pattern) show 2 additional peaks, which are characteristic of crystalline silicon oxide (FIG. 12, top XRD pattern). No apparent oxidation of Sn occurs during the coating process.

Figure 13A:
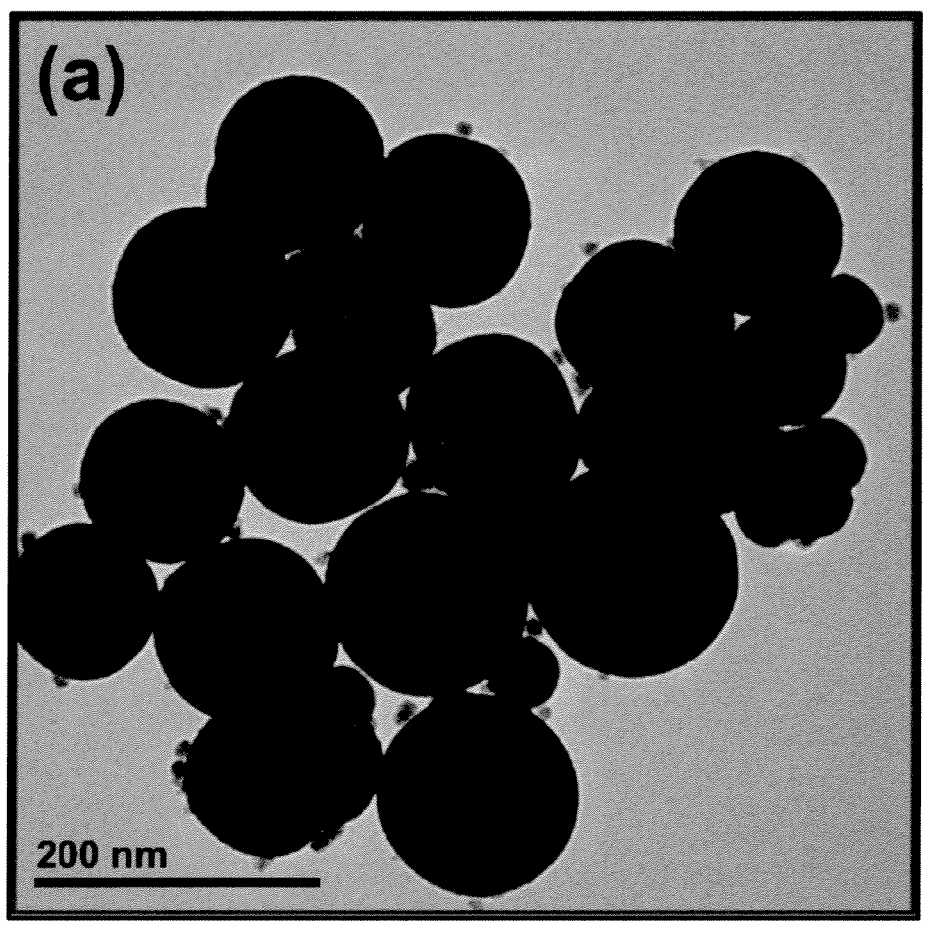
FIG. 13a shows a TEM image of as-prepared tin nanoparticles and FIG. 13b shows a TEM image of silica encapsulated tin nanoparticles.
Figure 13B:
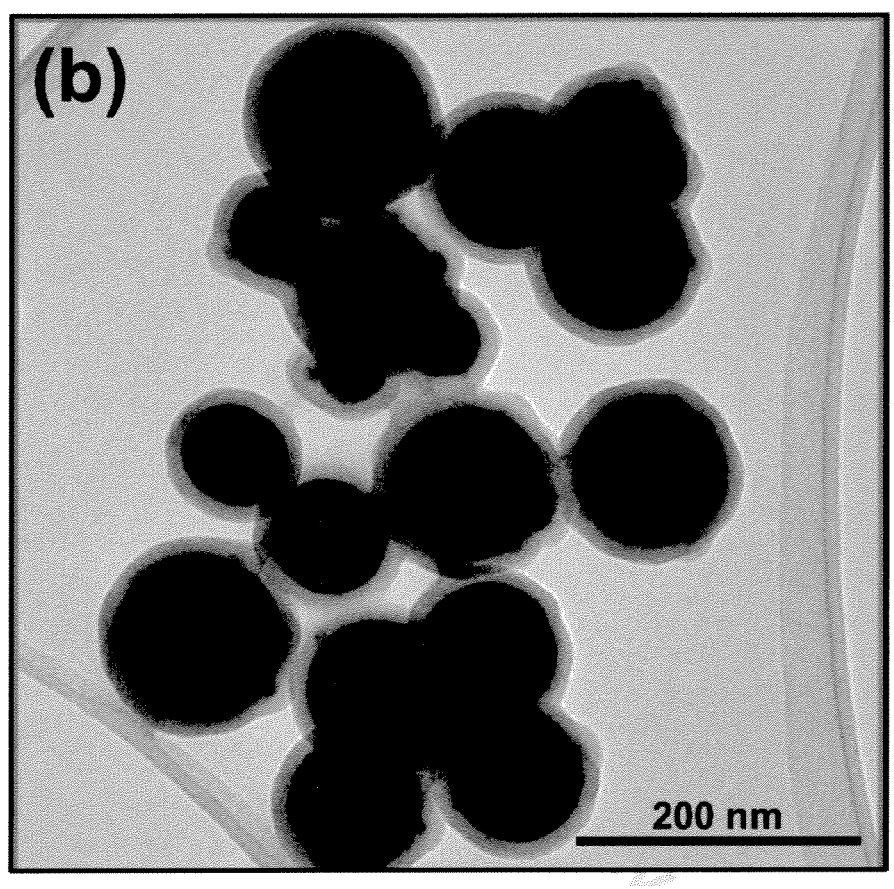

FIGS. 13a and 13b show the TEM images of as prepared Sn and core/shell $Sn/SiO_2$ nanoparticles respectively. Sn nanoparticles are typically spherical shape with particle sizes ranging from 60 to 100 nm (FIG. 13a). TEM of encapsulated nanoparticles (FIG. 13b) show silica shells as a distinct phase that is evenly coating Sn cores with thickness that appears to be independent of the core diameters.

Figure 14A:
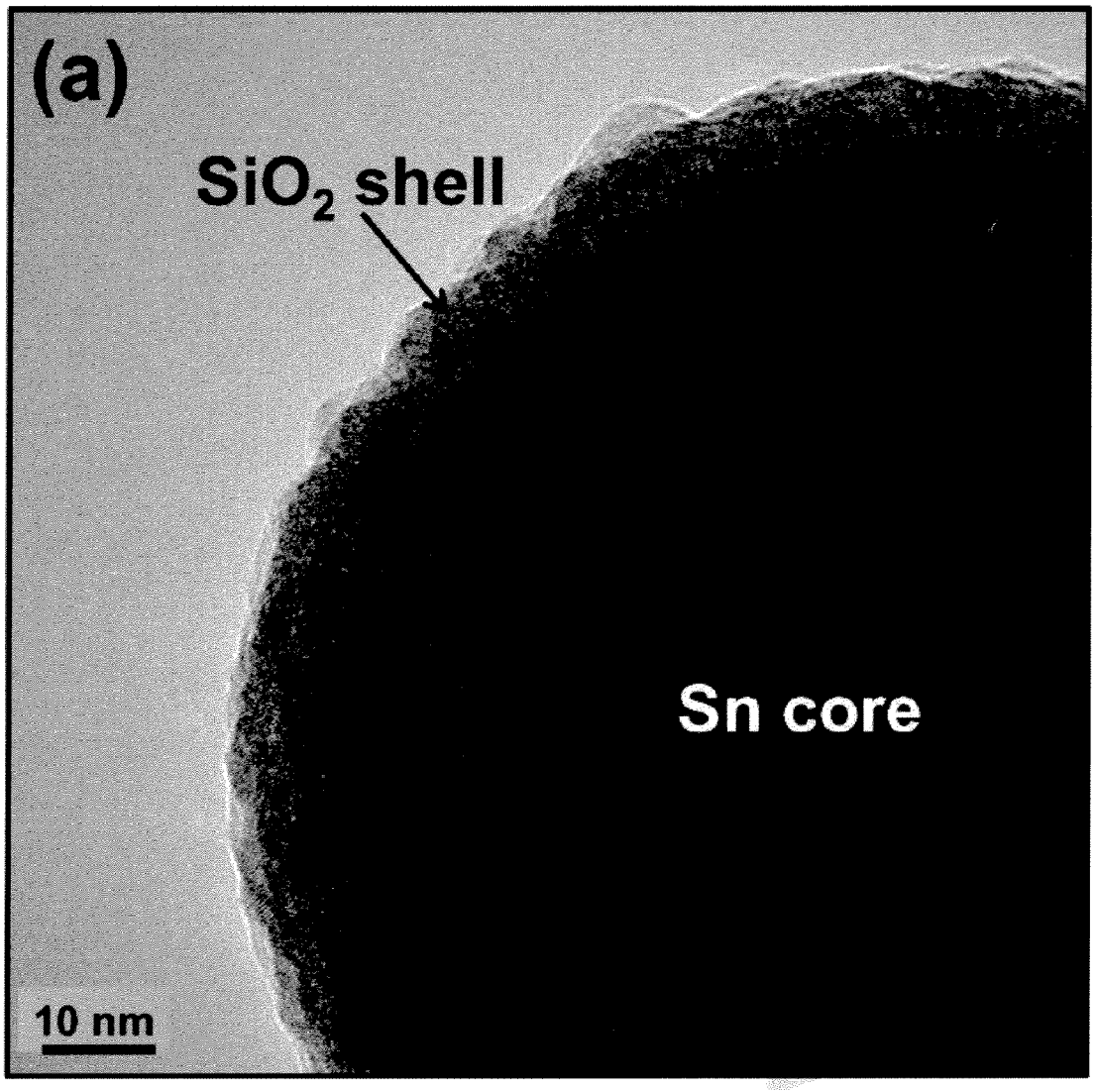
FIG. 14a shows a high-resolution TEM image of $Sn/SiO_2$ PCNP showing a crystalline silica shell with a thick grain boundary between the shell and the tin core.

The high resolution TEM image (FIG. 14a) clearly shows the core/shell structure of $Sn/SiO_2$ nanoparticles by the contrast in the core and the shell material. The silica shell is crystalline with thickness of ~5 nm, which indicates that the nucleation of silica was initiated from the surface of metallic tin nanoparticles. The boundary layer between the silica shell and the Sn core appears as dense and grainy (FIG. 14a). The silica coating ensures that the particle core structure maintains its chemical and structural integrity during exposure to elevated temperatures, restricts the leaking of molten metal during the heating cycles, and allows for a recrystallization process within the confined shell.

Figure 14B:
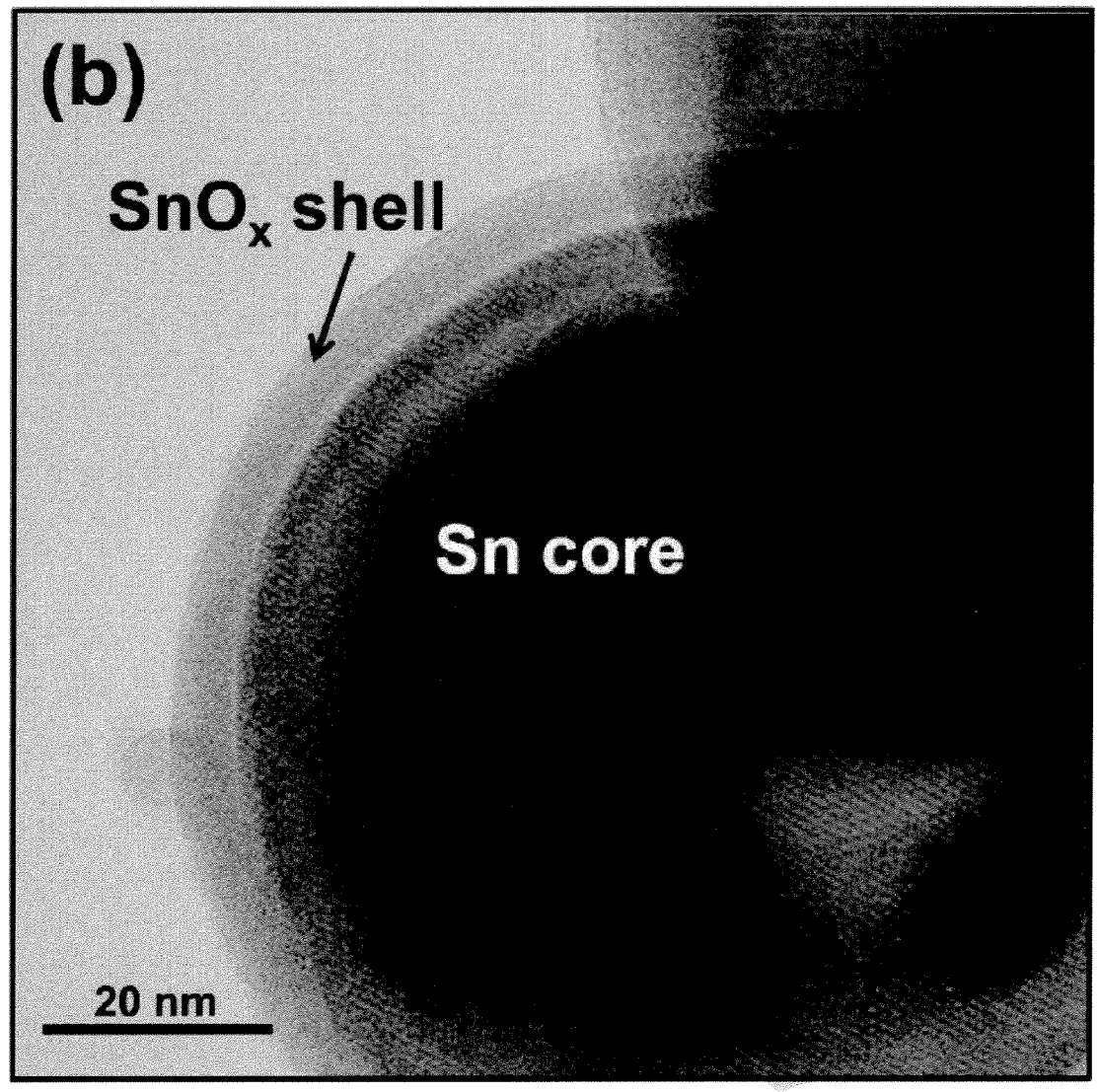
FIG. 14b shows an image of uncoated Sn nanoparticles showing an amorphous $SnO_x$ layer formed on the surface of tin core during the sample processing.

Sn nanoparticles that were not subject to the silica coating (FIG. 14b) tend to oxidize on the air during the handling process. Uncoated Sn particles revealed a 2-3 nm amorphous $SnO_x$ layer at the interface of the crystalline tin core. No such amorphous oxidation layers were found on silica coated particles, where silica coating was applied immediately after the synthesis of Sn nanoparticles.

Stable and homogeneous dispersions of $Sn/SiO_2$ PCNPs in TH66 were prepared by the addition of belzalkonium chloride (BAC) cationic surfactant followed by ultrasonification. The amount of surfactant was calculated from the optimized surfactant-to-nanoparticle ratio corrected for the surface area of 100 nm average diameter of $Sn/SiO_2$ PCNPs. Therefore 0.56 g, 1.12 g, 1.68 g, and 2.8 g of BAC were added to 40 ml of TH66 for 1.0, 2.0, 3.0 and 5.0 vol % loading of core/shell nanoparticles.

Figure 15A:
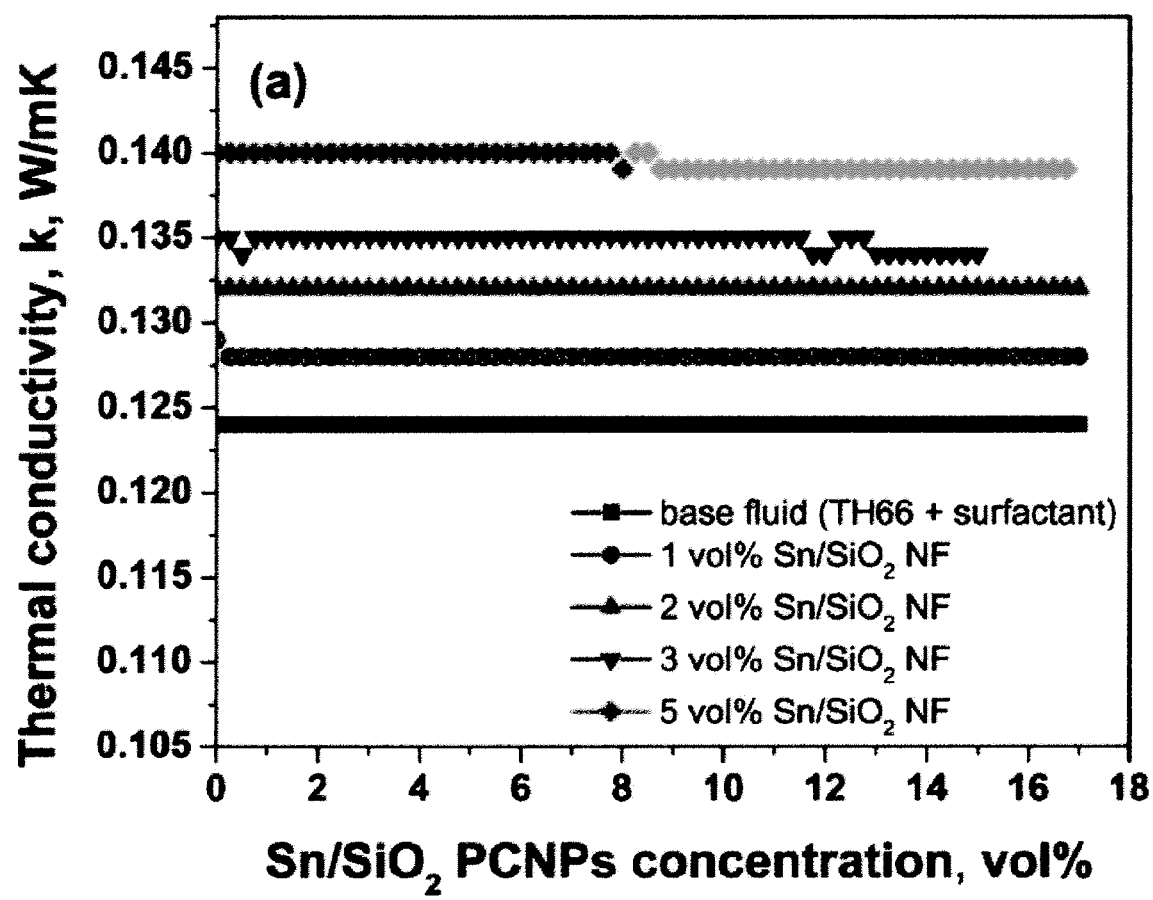
FIG. 15a shows an extended thermal conductivity measurements as a measure of nanofluid stability with stability of $Sn/SiO_2$ PCNPs nanofluids in TH66 at various loadings.
Figure 15B:
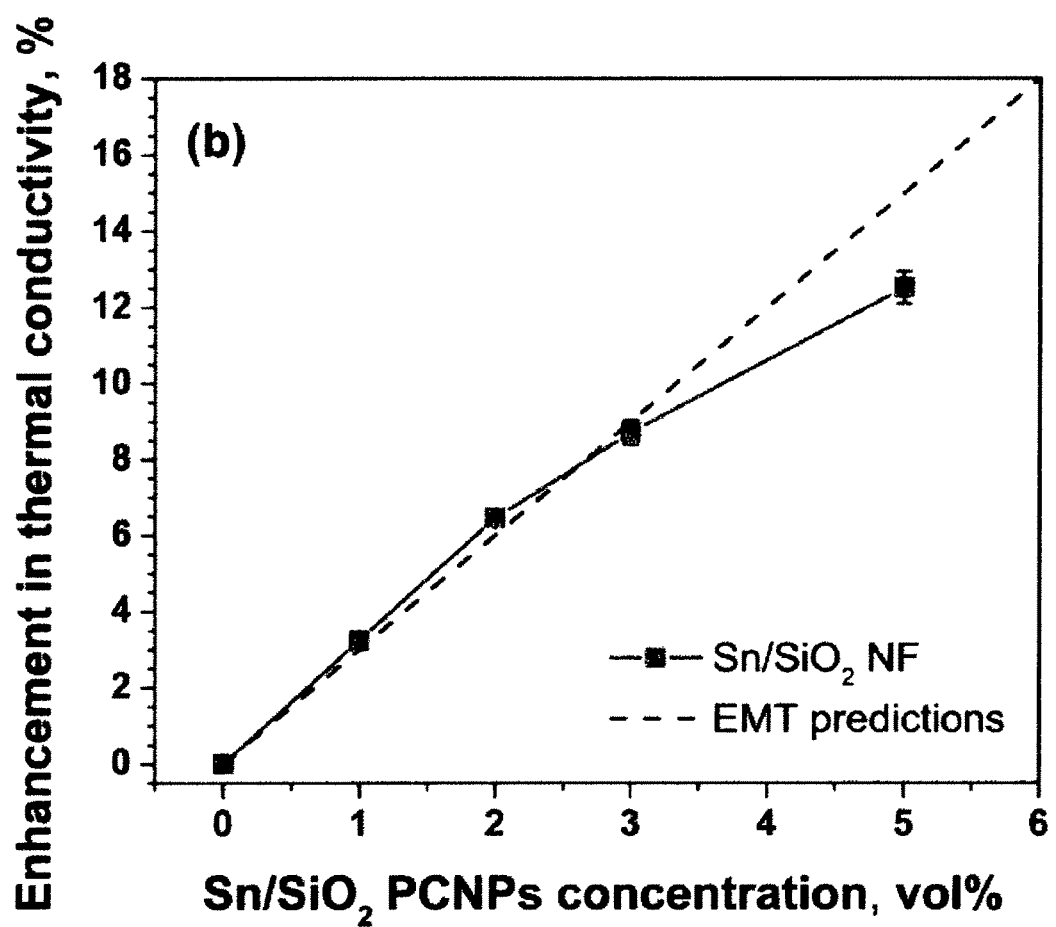
FIG. 15b shows enhancements in thermal conductivity of nanofluids at different $Sn/SiO_2$ PCNPs concentrations compared to the predictions of effective medium theory (EMT)

The thermal conductivity of nanofluids with 1-5 vol % loadings were measured and compared to the values of pure TH66. The thermal conductivity values were recorded automatically every 15 min over 15 hours. Nanoparticle settling typically results in a decrease in thermal conductivity values. The consistent thermal conductivity readings at all nanoparticle concentration over an extended time period (see FIG. 15a) allows us to reach conclusions about the stability of prepared $Sn/SiO_2$ PCNPs nanofluids in TH66. The thermal conductivity of TH66 with only surfactant was also tested, and no significant change in the thermal conductivity value was found due to the surfactant. Therefore, the effect of surfactant on the thermal conductivity of nanofluids can be excluded. Thermal conductivity of $Sn/SiO_2$ PCNPs nanofluids showed nearly linear increase with particle volume concentration (see FIG. 15b), following the prediction of the effective medium theory (EMT) for spherical particles (~3% increase in thermal conductivity for each volume percent of the solid particles added to the fluid). No additional enhancement in the thermal conductivity over the EMT predictions was observed, as it has been reported in the art for some nanofluids with metallic particles.

Figure 16A:
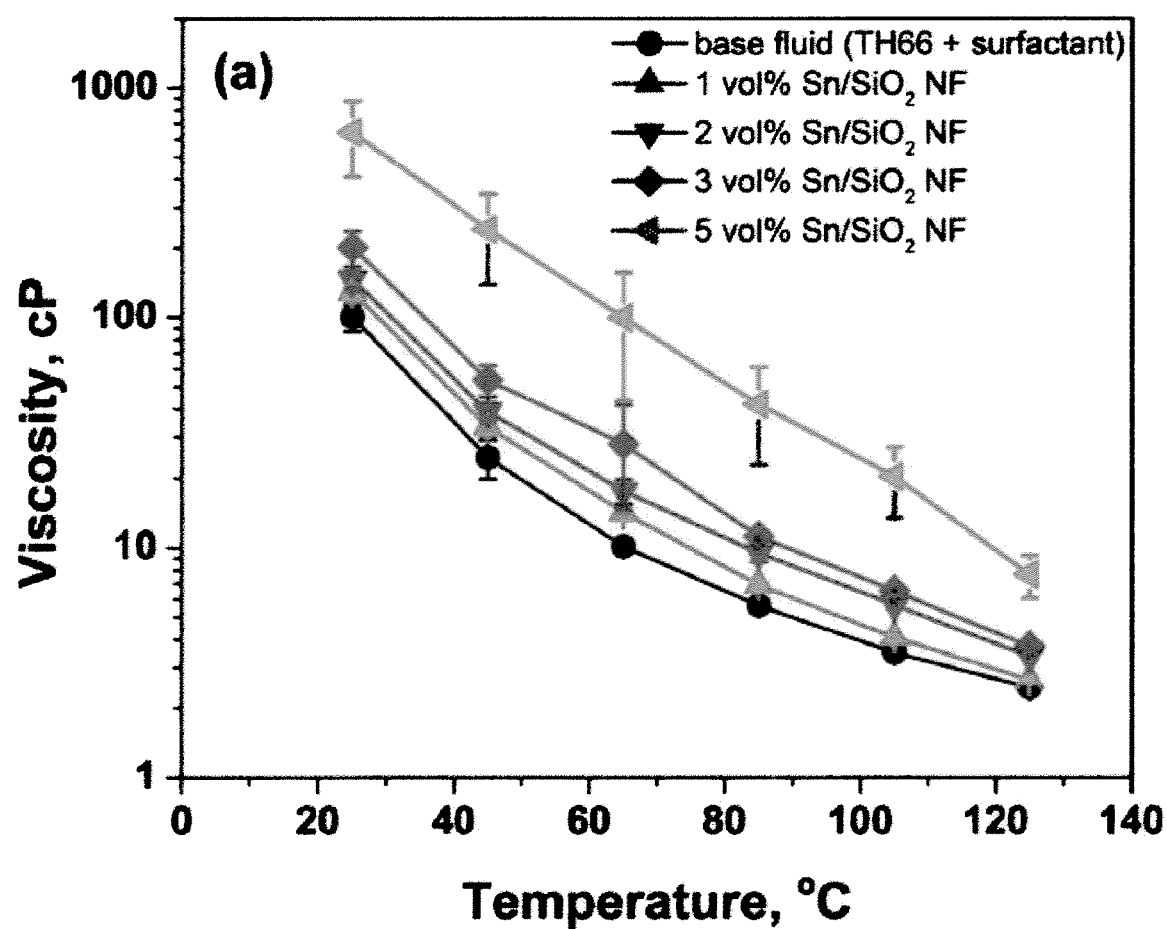
FIG. 16a shows viscosity of $Sn/SiO_2$ PCNPs nanofluids in TH66 as a function of temperature and FIG. 16b shows viscosity change with the volume concentration of nanoparticles.
Figure 16B:
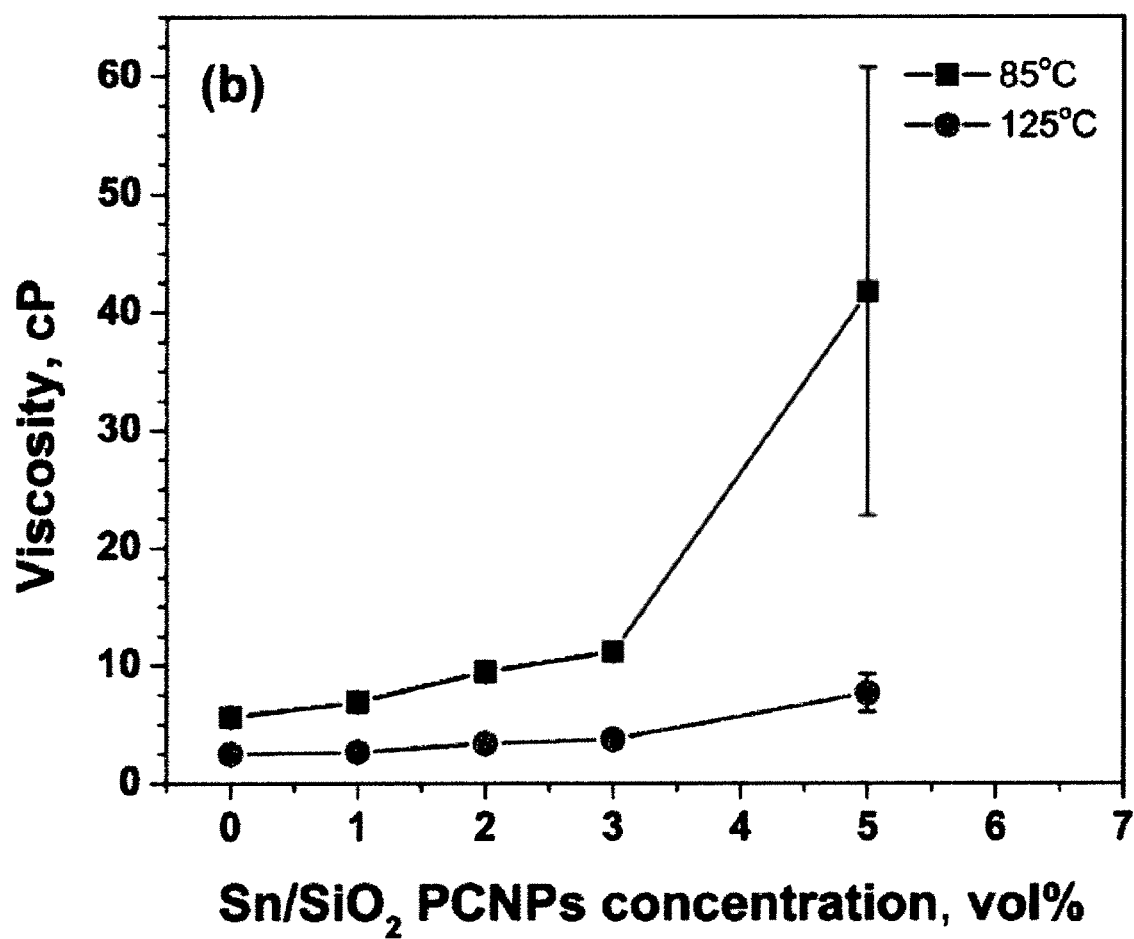

The viscosities of pure TH66 with surfactant and nanofluids with various loadings of Sn/SiO$_2$ PCNPs were measured between 25° C. and 125° C. (see FIG. 16a). The viscosity increases with concentration f nanoparticles (see FIG. 16b), and for the same particle concentration decreases with increase in temperature (see FIG. 16a). Relative increase in viscosity of nanofluids also decreases with increasing temperature, i.e., at higher temperatures, nanofluids flow more like the base fluid TH66. At room temperature, viscosity of 5 vol % Sn/SiO$_2$ PCNPs nanofluid was roughly an order of magnitude higher than viscosity of base fluid, while at 125° C. the viscosity of nanofluid and base fluid are quite similar. Although the viscosity of nanofluids decreases with temperature, the pumping penalty on the nanofluid may be higher than heat transfer and thermal storage benefits of adding nanoparticles. Therefore, the potential use of nanofluids for optimized thermal management applications may require some modest experimentation in terms of volume loadings of the nanoparticles.

Figure 17:
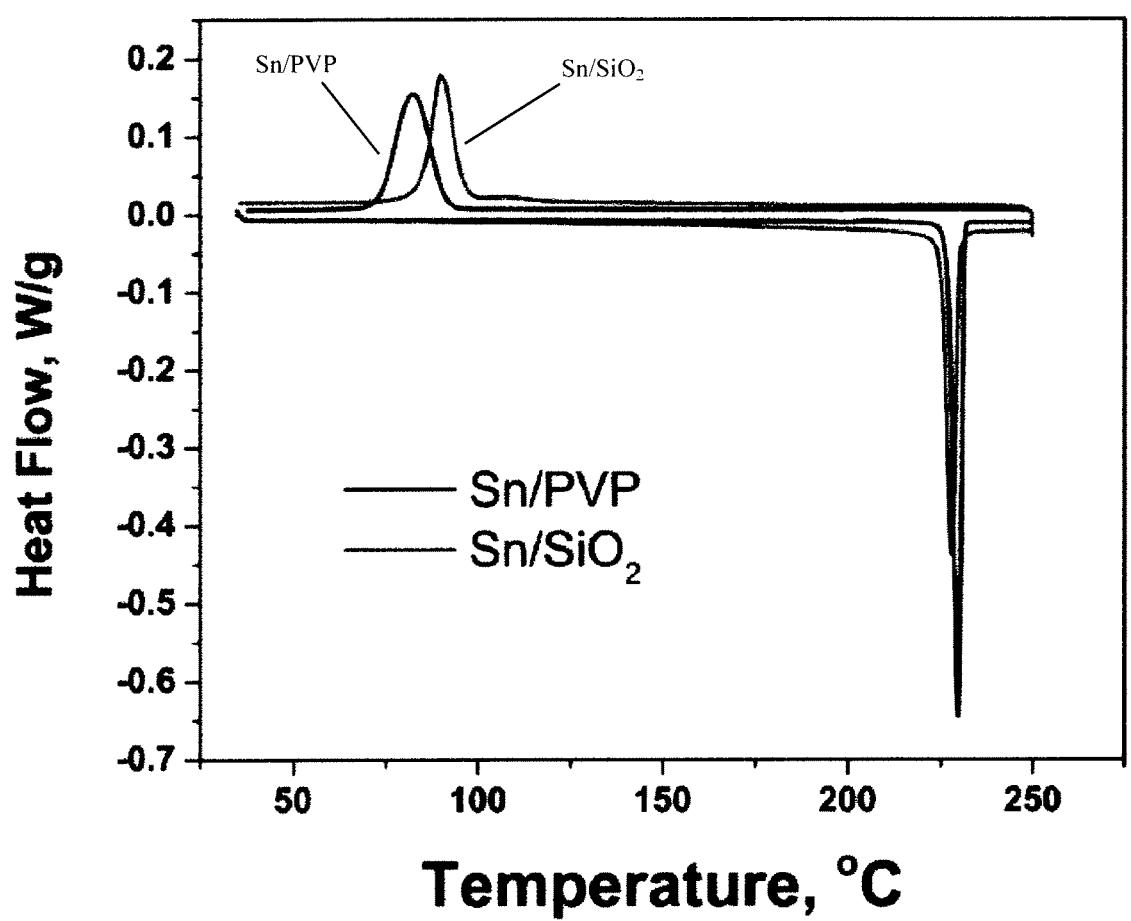
FIG. 17 shows heat/cool cycling of silica encapsulated tin nanoparticles ("r" line) compared to tin nanoparticles stabilized only with PVP ("b" line)

The melting temperature and latent heat of fusion of both Sn/PVP stabilized particles and Sn/SiO$_2$ PCNPs have been studied calorimetrically (see FIG. 17). The melting of Sn cores was observed at 228.3° C., while freezing occurred only at 98.3° C. Such large thermal hysteresis (undercooling) in tin melting/freezing (~130° C.) could be related to antifreezing properties of PVP shell or due to the small size of the high-purity Sn particles. Similar thermal hysteresis has been reported in the prior art for 5 nm Pb particles in SiO$_2$ matrix. This is interpreted as arising from the large undercooling of PB particles as a heterogeneous nucleation process in the nearly impurity-free fine particles.

The latent heat of fusion was measured to be 58 U/g for Sn/PVP nanoparticles and 48 J/g for Sn/SiO$_2$ PCNPs, which is lower than that of the bulk value reported for Sn metal (60 J/g). The difference between experimental and prior art values is likely due to the mass contribution of PVP and silica coatings that are inert in the tested temperature range (50° C.-285° C.). The mass fraction of tin in Sn/PVP was determined to be 97%, while Sn/SiO$_2$ PCNPs were composed of 8% of tin correspondingly.

Figure 18A:
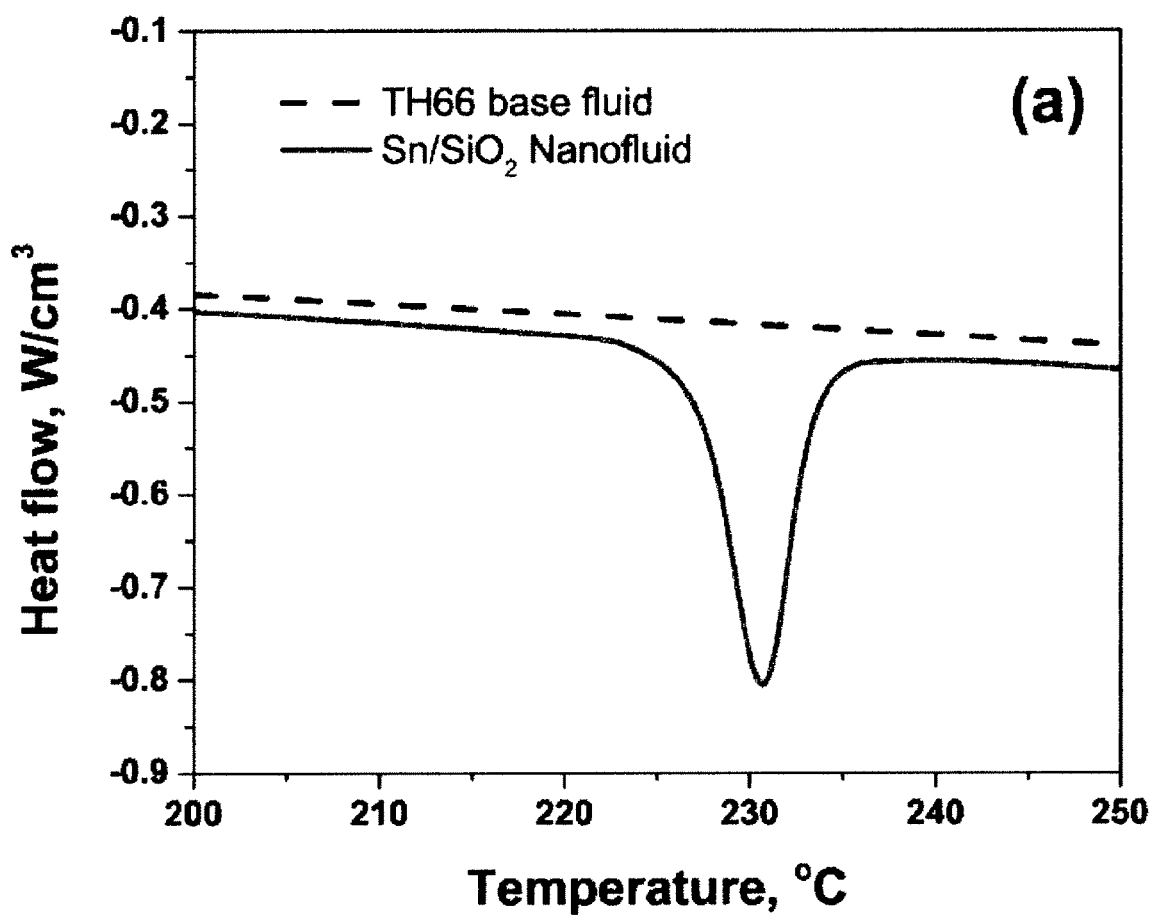
FIG. 18a shows volumetric heat absorption of pure TH66 (dashed line), and 5 vol % $Sn/SiO_2$ PCNPs nanofluids (solid line)

Total heat absorbed by Sn/SiO$_2$ nanofluids in TH66 was studied by thermal cycling between 50° C. and 285° C. FIG. 18a shows the truncated DSC curves for the pure TH66 and the composite nanofluid. Clearly, the melting of tin core is observed in the composite nanofluid at ~232° C.

The effective specific heat ($C_{p(nf)}$) and density ($\rho_{nf}$) of the Sn/SiO$_2$ nanofluids at various temperatures were calculated using the rule of mixtures (Eqs. 4 & 5), and total volumetric heat capacity was calculated using Equation 6:

Effective Specific Heat:

$$C_{p(nf)} = \frac{(1-\varphi_{np})C_{p(F)}\rho_F + \varphi_{np}C_{p(np)}\rho_{np}}{(1-\varphi_{np})\rho_F + \varphi_{np}\rho_{np}} \quad (4)$$

Effective Density of Nanofluid:

$$\rho_{nf} = \varphi_{np}\rho_{np} + (1-\varphi_{np})\rho_F \quad (5)$$

Volumetric Heat Capacity:

$$\Delta Q_{PCNF} = \rho_{nf}C_{p(nf)}\Delta T + \varphi_{np}\rho_{np}\Delta H_{f(PCNP)} \quad (6)$$

Where $C_{p(nf)}$ is specific heat capacity of mixture (nanoparticles+surfactant+TH66), $C_{p(F)}$ is specific heat of base fluid, $C_{p(np)}$ is the specific heat of nanoparticles, $\varphi_{np}$ is volume fraction of nanoparticles, $\rho_F$ is density of base fluid, $\rho_{np}$ is density of nanoparticles, $\rho_{nf}$ is the effective density of nanofluid, $\Delta T$ is the difference in temperature measured from $T_1$ to $T_2$ (° C.), and $\Delta H_{f(PCNP)}$ is the heat of fusion of Sn/SiO$_2$ PCNPs.

The measured specific heat of TH66 ranged from about 2 J/gK at 100° C. to about 2.7 J/gK at 280° C. The reported values by the manufacturer are 1.85 J/g-K at 100° C. and 2.5 J/gK. There is about 8-10% difference in our measurements as compared to the reported values. This difference could be a combination to both the experimental error and the property variation from batch to batch for TH66. The temperature dependence of density of the base TH66 fluid and Sn/SiO$_2$ PCNPs were assumed to be constant in the given range of temperatures (50° C.-285° C.).

Figure 18B:
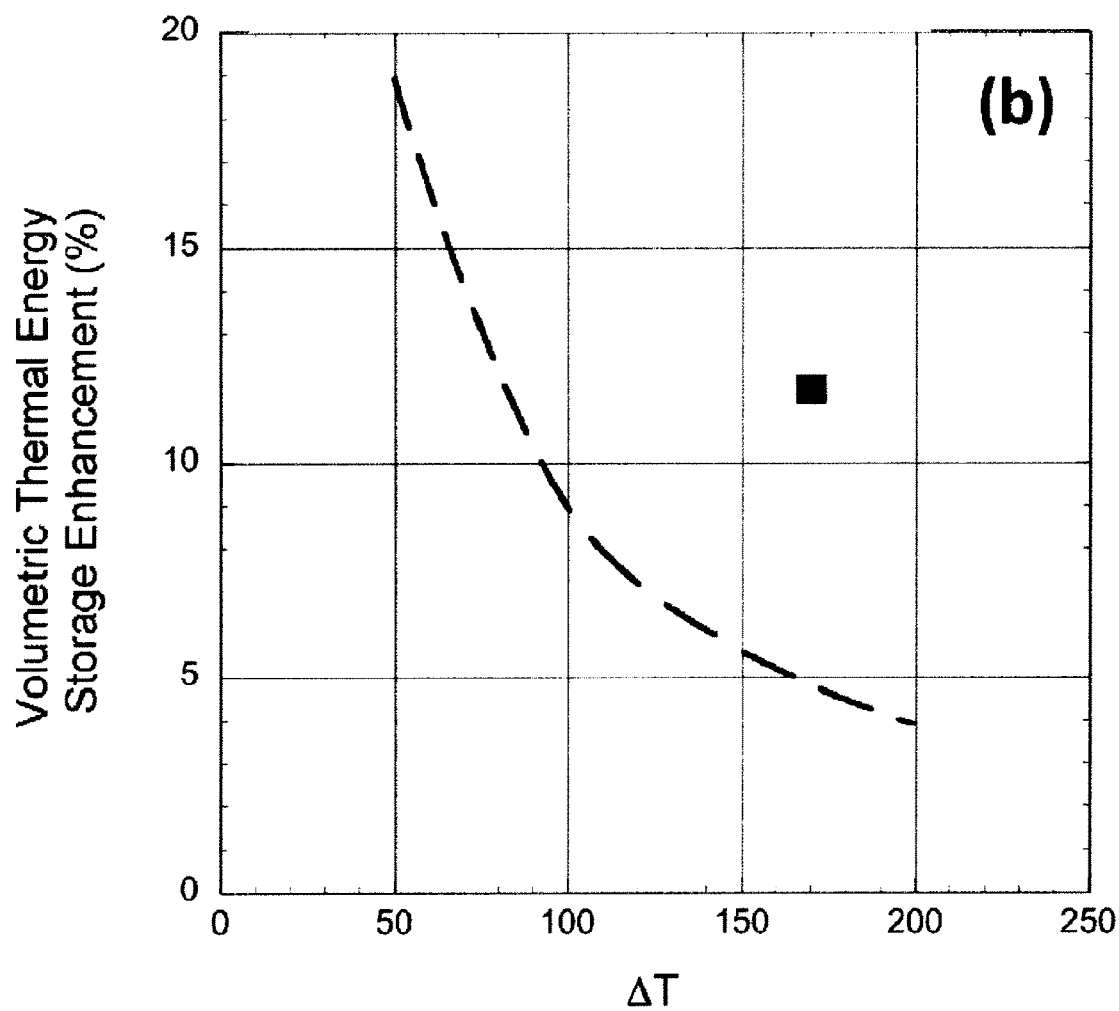
FIG. 18b shows comparison of the calculated thermal energy storage enhancement with the experimental data for $Sn/SiO_2$-TH66 at 5 vol. % nanoparticle loadings.

No endothermic or exothermic peaks were observed for pure TH66 or the TH66/surfactant base fluid in the studied temperature range. Nanofluids with Sn/SiO$_2$ PCNPs have shown both endothermic and exothermic peaks due to melting and re-crystallization of tin (see FIG. 17). FIG. 18b shows the volumetric thermal energy storage (or increased absorption) for the 5 vol % Sn/SiO$_2$ PCNPs over the base TH66 as a function f the temperature range the fluid is cycled ($\Delta T$). The dashed curve is the calculated values (per Eq. 6) based on the measured specific heat of the TH66, density of TH66 and Sn/SiO$_2$ nanoparticles, and taking the heat of fusion for tin as 59 J/g. It should be noted that the volumetric thermal energy storage enhancement is strongly dependent on the temperature range over which the fluid is cycled. The larger the ($\Delta T$), the effect of specific heat of the fluid (sensible heat) is more dominant than the heat absorption from heat of fusion of the melting tin nanoparticles.

The measured volumetric thermal energy storage capacity $\Delta Q_{PCNF}$ TH66 with 5 vol, % Sn/SiO$_2$ PCNPs is 408±0.42 J/cc for the temperature range of 170° C. The calculated value for the same system is 383 J/cc. Thus, the measured value is about 6.5% higher than the estimation. One of the possible reasons for this discrepancy may be because the uncertainty in the total amount of tin in the fluid. Nevertheless, the total volumetric thermal energy storage of the 5 Sn/SiO$_2$ PCNP's show increased storage by about 11%. If the reversibility of Sn melting/freezing is improved, the cycling temperature range can be narrowed closer to the melting point of Sn core, thus increasing contribution of volumetric thermal energy storage from the melting of Sn.

Figure 19A:
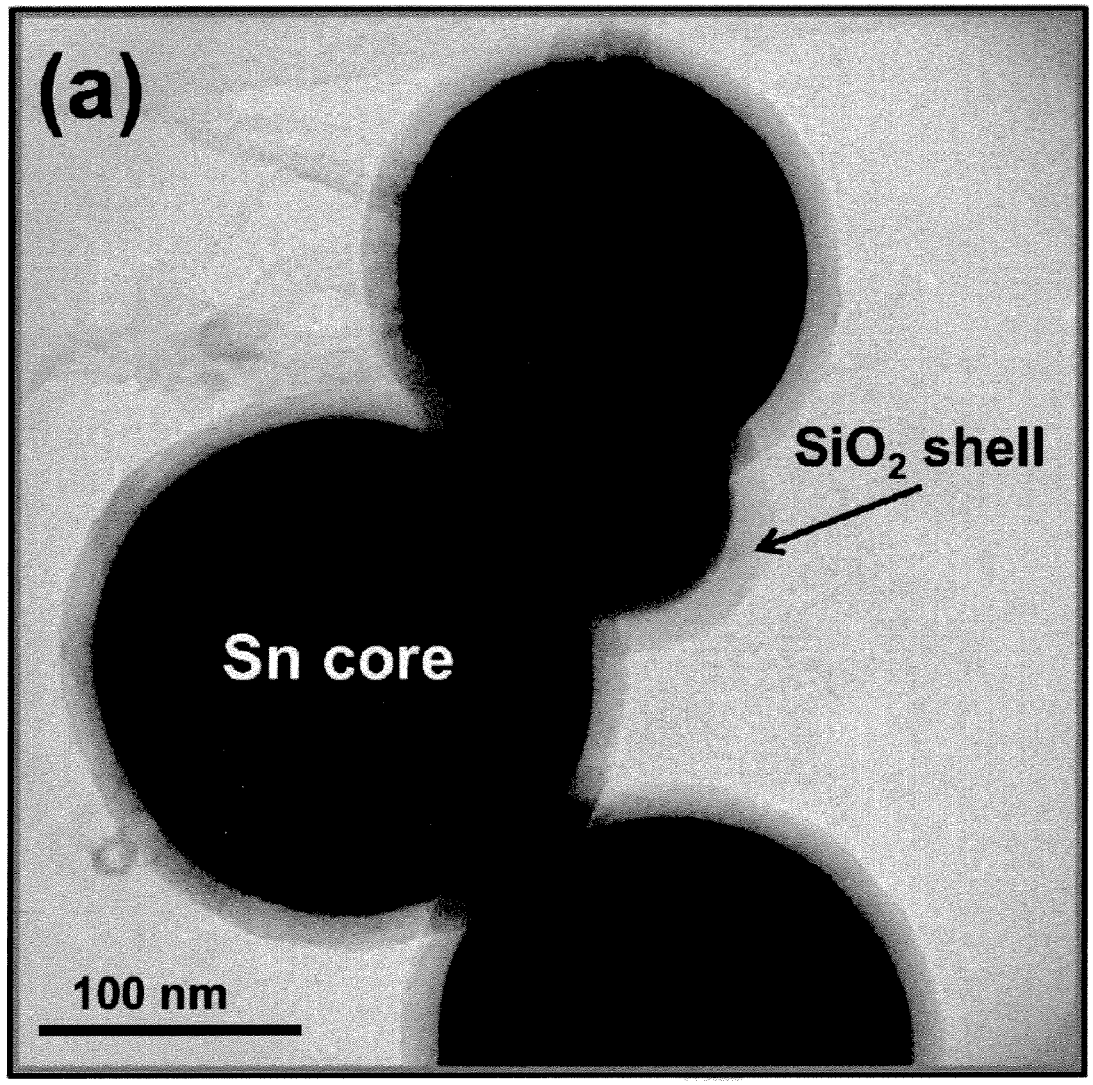
FIG. 19a shows a TEM image of $Sn/SiO_2$ PCNPs before twenty heating and cooling cycles and FIG. 19b an image after twenty heating and cooling cycles.
Figure 19B:
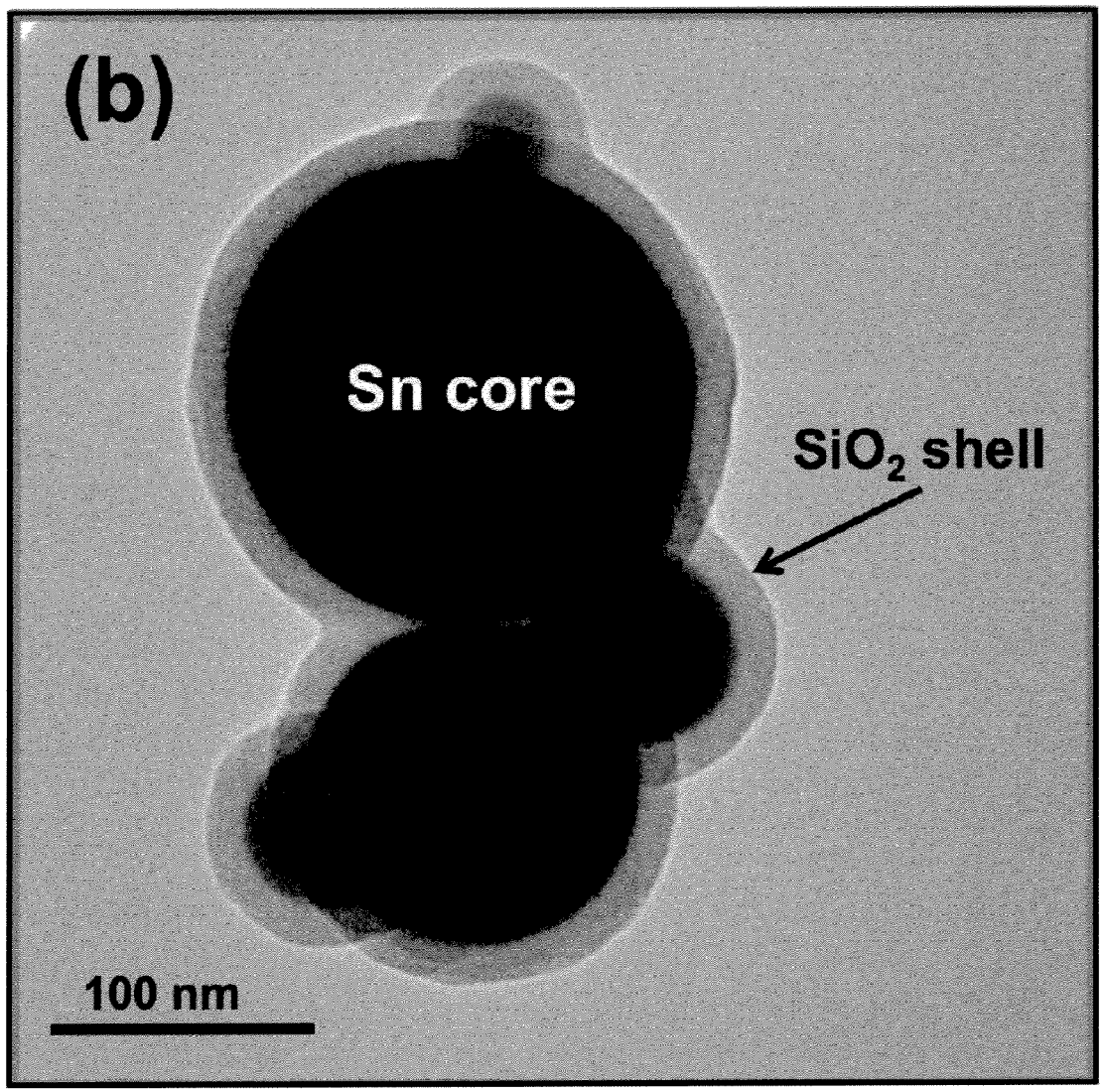

The thermal stability of Sn/SiO$_2$ PCNPs was investigated by conducting 20 heat/cool cycles between 100° C. and 270° C. TEM images of Sn/SiO$_2$ PCNPs were taken before and after this cycling (see FIG. 19). Individual Sn spheres remain intact, coated with continuous SiO$_2$ shell, which confirms the thermal stability of core/shell Sn/SiO$_2$ structures.

Addition of core/shell Sn/SiO$_2$ PCNPs to high temperature synthetic heat transfer fluid advantageously enhances the thermal conductivity of the base fluid, while also increasing the total heat capacity. The ceramic shell protects Sn cores from oxidation, thereby providing long-term stability of Sn containing nanofluids. On the other hand, encapsulation of Sn cores allows repeated thermal cycling and prevents coalescence into larger size Sn cores when they are melted. Reversible melting/freezing of nanoparticle cores is desired for higher enhancement in thermal storage capacity. The thermal hysteresis observed in current Sn/SiO$_2$ PCNPs can be minimized by introducing impurities to the Sn core and/or by illuminating PVP layer from the nanomaterials structure.

Because the large undercooling, Sn may not be the best core material for practical applications. In such a large temperature range the overall thermal energy storage will be dominated by the specific heat of the base fluid. The most benefits from PCM latent heat of fusion will be obtained in a most preferred embodiment when nanofluid is used in a narrow temperature window. Thus, the general criteria for selection of appropriate core/shell PCNPs are high heat of fusion, reversible melting and crystallization temperatures, and table shell materials. Addition of well-engineered phase change nanomaterials to high temperature heat transfer fluid promises dual functionality in heat transfer and thermal storage capacity.

Silica encapsulated tin nanoparticles have been synthesized using a cost effective modified sol-gel process. Addition of core/shell $Sn/SiO_2$ nanoparticles to commercial heat transfer fluid (HTF) Therminol 66 increased the thermal conductivity of the fluid as predicted from the effective medium theory, and also improved the total heat absorption of the fluid due to the contribution of latent heat of fusion, when tin nanoparticles melted inside of the silica capsules. Thermal stability of core/shell nanomaterials during heat/cool cycles was confirmed with DSC measurements and TEM imaging. Dual functionality of nanofluids with ceramic encapsulated phase change nanoparticles was demonstrated. Better heat transfer and thermal storage properties of engineered HTFs nanofluids versus conventional HTFs carry a great potential to increase system efficiency, reduce structural storage volume, and contribute in bringing solar power generation costs at CSP plants in line with other conventional power generation sources.

Figure 20:
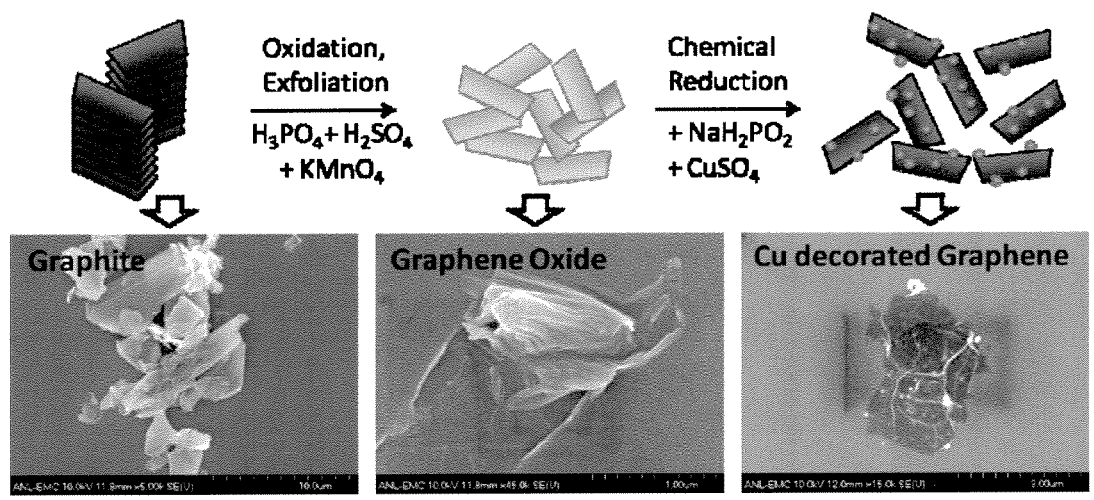
FIG. 20 shows a schematic of a designed heat transfer nanofluid having selected thermal enhancement mechanisms (Cu Plasmon resonance and graphene percolation)
Figure 21:
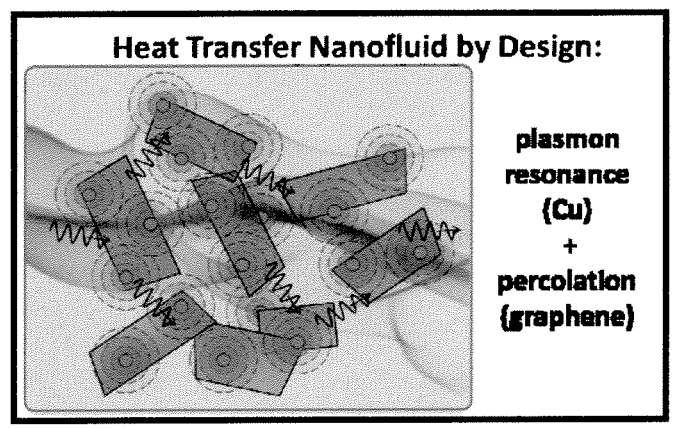
FIG. 21 shows a series of chemical methods of manufacture of hybrid Cu/graphene nanomaterials and corresponding SEM micrographs of the associated articles of manufacture.
Figure 22A:
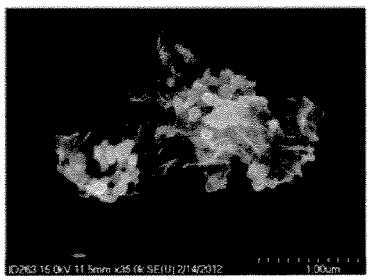
FIGS. 22a-22f illustrates SEM images of various Cu/graphene particulates with associated X-ray dispersive imaging of Cu and graphene components.
Figure 22B:
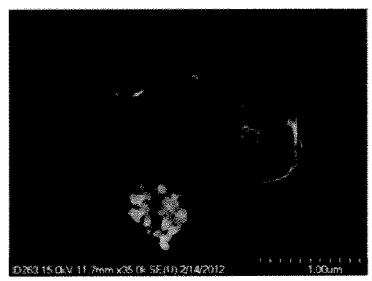
Figure 22C:
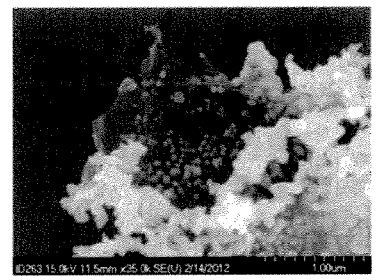
Figure 22D:
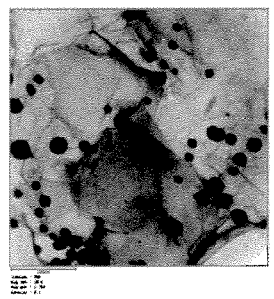
Figure 22E:
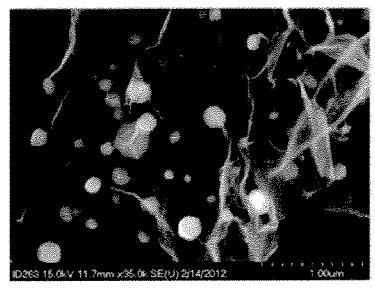
Figure 22F:

Hybrid Copper Decorated Graphene Nanomaterials with Advanced Thermal Conductivity As shown in FIG. 20, a simple, low cost, and up-scalable wet chemical synthesis method was developed for hybrid copper/graphene nanomaterials. The hybrid nanomaterials system were designed as in FIG. 21 to take advantage of Cu plasmon resonance and graphene percolation to provide enhanced thermal conductivity characteristics. Variations in synthesis procedures and reaction conditions resulted in different morphologies of hybrid nanonomaterials, including the purity of Cu phase, particle sizes, nucleation density, and homogeneity of Cu nanoparticle distribution. Use of SEM and TEM allowed optimizing the synthesis procedure and achieving the desired nanomaterial morphology to produce superior heat transfer performance. As shown in FIGS. 22a-22f a variety of particle morphologies and structures can be provided for enhanced thermal property applications.

Figure 23A:
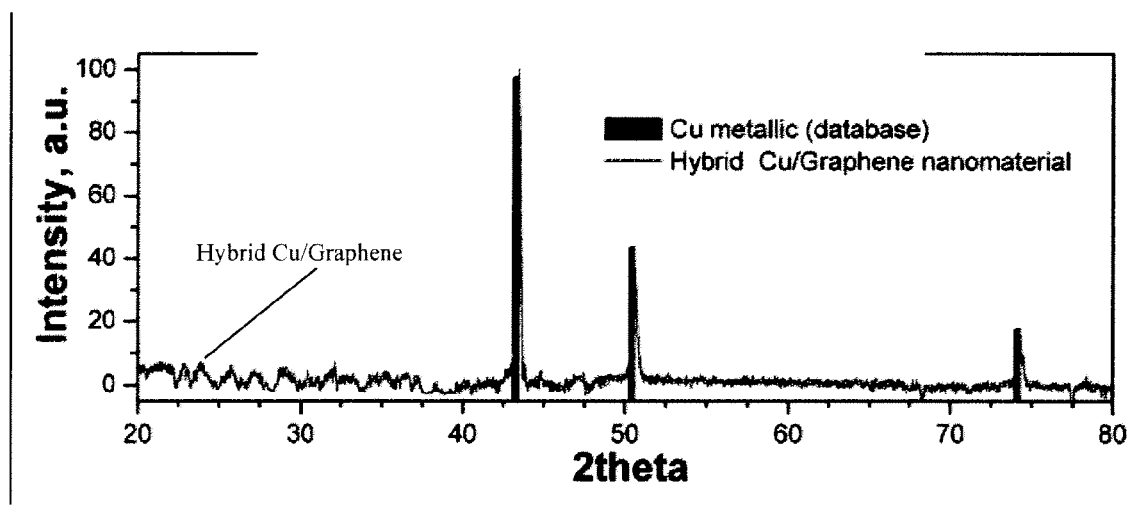
FIG. 23a shows a powder X-ray diffraction plot for Cu.
Figures 23B, 23C, 23D:
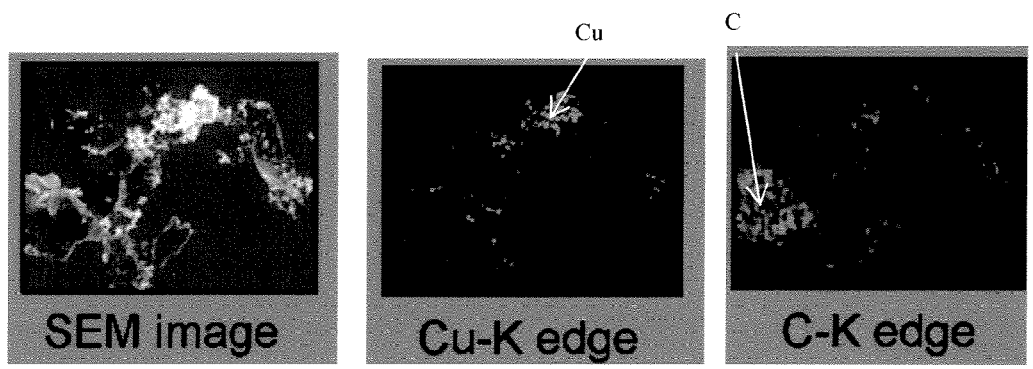
FIG. 23b shows an SEM image.
FIG. 23c shows an energy dispersive X-ray spectroscopy image of nanoparticles for the Cu—K edge and FIG. 23d the image for the Carbon K edge.
Figure 24:
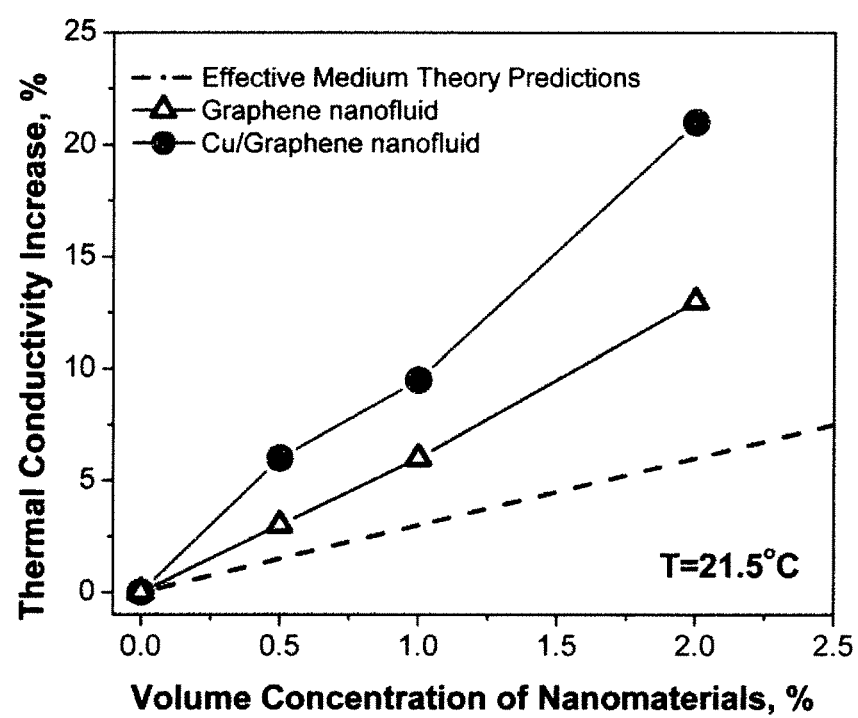
FIG. 24 shows increase of thermal conductivity versus volume percent concentration of nanomaterials versus effective medium theory predictions.
Figure 25:
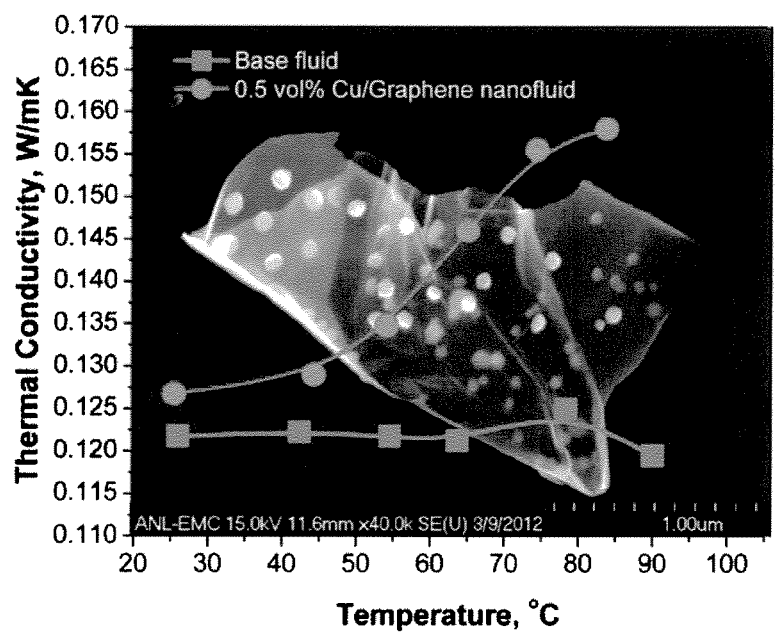
FIG. 25 shows thermal conductivity versus temperature for a base fluid and for a 0.5 vol % Cu (graphene nanofluid).

Purity of metallic Cu phase was confirmed with powder X-ray Diffraction (see FIG. 23a), while atomic distribution of elements in hybrid nanomaterials was characterized with SEM and Energy-Dispersive X-Ray Spectroscopy (see FIGS. 23b-23d): Hybrid Cu/Graphene nanomaterials were dispersed in synthetic heat transfer fluid Therminol®59 at various volume concentrations. Stable nanofluid dispersions were achieved with combination of two surfactants: octadecane thiol and benzalkonium chloride. Thermal conductivity of Cu/Graphene dispersions was assessed as a function of volume concentration and temperature. As shown in FIGS. 24 and 25, significant increase in thermal conductivity above the effective medium theory, and graphene suspension of the same concentration was observed. Increase in thermal conductivity with increasing temperature is also indicative of engagement of additional heat transfer mechanisms (i.e. percolation and plasmonic resonances) as was designed by nanofluid engineered approach and morphology of nanomaterials. Nanofluids with copper decorated graphene sheets were produced. The selection of nanomaterials was achieved by projected benefits from percolation heat transfer mechanisms (see FIG. 21) of graphene sheets, phonon resonance heat transfer mechanism of metallic nanoparticles, and synergetic effects of combining Cu and graphene. Besides, Cu nanoparticles attached to graphene sheets provide spacial separations and prevent them from agglomeration, which is known to be detrimental for the phonon resonance mechanism. Engineered hybrid Cu/graphene nanofluids have demonstrated advanced thermal conductivity significantly higher that the effective medium theory predictions, and graphene nanofluids.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. An article of manufacture, comprising:
    an alkali halide eutectic salt solution; and
    a plurality of nanocrystalline metal particles dispersed in the alkali halide eutectic salt solution, the plurality of nanocrystalline metal particles having a coating disposed thereon and the particles capable of undergoing a phase change.

2. The article of manufacture as described in claim 1 wherein the alkali halide eutectic salt solution comprises an alkali chloride eutectic salt solution.

3. The article of manufacture as defined in claim 1 wherein the nanocrystalline metal particles consist of zinc particles.

4. The article of manufacture as defined in claim 1 wherein the coating comprises an oxide.

5. The article of manufacture as defined in claim 4 wherein the oxide comprises trioctyl phosphine oxide.

6. The article of manufacture as defined in claim 1 wherein the nanocrystalline metal particles have a size of about 600 nm to 5 micrometers.

7. The article of manufacture as defined in claim 1 further comprising the plurality of nanocrystalline metal particles comprising zinc up to 10 volume % of the total volume of nanocrystalline metal particles and alkali halide eutectic salt solution.

8. A method of preparing a material having selected heat transfer and thermal properties, comprising:
    providing an alkali halide eutectic salt; and
    dispersing in the alkali halide eutectic salt a plurality of nanocrystalline metal particles having a coating disposed thereon the metal particles.

9. The method as described in claim 8 wherein the alkali halide eutectic salt comprises an alkali chloride eutectic salt.

10. The method as defined in claim 8 wherein the nanocrystalline metal particles consist of zinc particles.

11. The method as defined in claim 8 wherein the coating comprises an oxide.

12. The method as defined in claim 11 wherein the oxide comprises trioctyl phosphine oxide.

13. The method as defined in claim 8 wherein the nanocrystalline metal particles have a size of about 600 nm to 5 micrometers.

14. The method as defined in claim 8 wherein the alkali halide eutectic salt is provided as a 85-90% eutectic salt solution.

* * * * *